(12) United States Patent
Herman et al.

(10) Patent No.: US 8,270,788 B2
(45) Date of Patent: Sep. 18, 2012

(54) OPTICAL DEVICES AND DIGITAL LASER METHOD FOR WRITING WAVEGUIDES, GRATINGS, AND INTEGRATED OPTICAL CIRCUITS

(76) Inventors: Peter R. Herman, Mississauga (CA); Haibin Zhang, Portland, OR (US)

( * ) Notice: Subject to any disclaimer, the term of this patent is extended or adjusted under 35 U.S.C. 154(b) by 261 days.

(21) Appl. No.: 12/301,496

(22) PCT Filed: May 18, 2007

(86) PCT No.: PCT/CA2007/000875
§ 371 (c)(1),
(2), (4) Date: May 8, 2009

(87) PCT Pub. No.: WO2007/134438
PCT Pub. Date: Nov. 29, 2007

(65) Prior Publication Data
US 2009/0304331 A1    Dec. 10, 2009

Related U.S. Application Data

(60) Provisional application No. 60/801,386, filed on May 19, 2006.

(51) Int. Cl.
*G02B 6/34* (2006.01)
*B29D 11/00* (2006.01)
*C03B 37/018* (2006.01)
*H01L 21/00* (2006.01)

(52) U.S. Cl. ............... 385/37; 385/14; 385/42; 385/129; 385/130; 264/1.37; 65/392; 438/31; 438/32

(58) Field of Classification Search ............... 385/37, 385/30, 129, 130, 132, 14, 42; 438/31, 32; 65/392; 264/1.37
See application file for complete search history.

(56) References Cited

U.S. PATENT DOCUMENTS

| | | | |
|---|---|---|---|
| 5,413,884 A * | 5/1995 | Koch et al. | 430/5 |
| 6,573,026 B1 * | 6/2003 | Aitken et al. | 430/290 |
| 6,768,850 B2 * | 7/2004 | Dugan et al. | 385/124 |
| 7,010,196 B2 * | 3/2006 | Liaw | 385/37 |
| 2002/0076655 A1 * | 6/2002 | Borrelli et al. | 430/321 |
| 2004/0008940 A1 * | 1/2004 | Liaw | 385/37 |
| 2009/0304331 A1 * | 12/2009 | Herman et al. | 385/37 |

* cited by examiner

*Primary Examiner* — Brian Healy

(57) ABSTRACT

The invention relates to devices having periodic refractive index modulation structures and fabrication methods for the devices using a laser means. By focusing a pulsed laser beam into a transparent material substrate, a path of laser modified volumes can be formed with modified refractive index compared with the unprocessed material. By selecting appropriate laser parameters and relative scan speed, the laser modified path defines an optical waveguide. Separation distance of the individual modified volumes define a periodic modification pattern along the waveguide path, so that the waveguide structures also exhibit grating responses, for example, as spectral filters, Bragg reflectors, grating couplers, grating sensors, or other devices. This method of direct laser fabrication enables one-step fabrication and integration of periodic or aperiodic refractive-index modulation devices together with optical waveguiding properties to enable low-cost, multifunctional 1D, 2D or 3D optical circuit fabrication for simple and complex applications.

16 Claims, 24 Drawing Sheets

OPTICAL DEVICES AND DIGITAL LASER METHOD FOR WRITING WAVEGUIDES, GRATINGS, AND INTEGRATED OPTICAL CIRCUITS

PRIORITY

This application claims the benefit of U.S. Provisional Patent Application No. 60/801,386, filed on 19 May 2006.

FIELD OF THE INVENTION

The present invention relates to optics and photonics. In particular, the present invention relates to waveguides, gratings and integrated optical circuits.

BACKGROUND OF THE INVENTION

In optics, spatial periodic modulation of refractive index of an optical material provides general means for spectral control of the transmission, reflection or diffraction of light. As an example, fiber Bragg gratings ("FBG") are widely employed in the sensing and telecom applications as narrow-band spectral filters. FBGs are generally made by forming a periodic refractive index change along the fiber length by applying periodic laser exposure in the photosensitive core waveguiding region. Bragg gratings function as fundamental filter and/or sensor components used in many conventional optical circuits, both in fiber and planar lightwave circuits. In another manifestation of fiber-based gratings, long period gratings ("LPG") can be formed by similar means, with the purpose of coupling light from/to the fiber core to/from the cladding modes.

Several methods have been applied to fabricate Bragg and long-period gratings within existing waveguide structures, including various types of optical fibers and planar structures.

For example, Hill et al. discloses a FBG structure in U.S. Pat. No. 4,474,427. A laser fabrication method for a laser propagating inside the core of an optical fiber is taught, and requires partial reflection to create a counter-propagating beam that upon interference with the incoming beam, forming a relatively narrow spectrum grating with Bragg reflection only at the wavelength of the writing laser.

U.S. Pat. No. 4,807,950 to Glenn et al. discloses FBG fabrication by two-beam laser interference (holography) with an ultraviolet laser source. However, the method requires a pre-existing waveguide (i.e a photosensitive core) in which the external laser can interact and modify the refractive index change.

U.S. Pat. No. 5,104,209 to Hill et al. describes fiber grating fabrication by an amplitude mask. Similar with the previous methods, an existing waveguide is required to modify the refractive index of the core and thereby form a grating (in the photosensitive core). As well, a point-by-point method is a relatively slow fabrication method, is generally directed to coarse (long period) structures, and requires an existing waveguide and a mask.

A further improvement on the above point-by-point method is disclosed by Snitzer et al. in Canadian Patent No. 2,372,939 (see PCT Patent No. WO9409369; also European Patent No. 1,197,771 and U.S. Pat. No. 5,351,321), where an amplitude mask technique comprising a series of squares apertures is used. This technique also requires an existing waveguide and uses an ultraviolet light source.

Hill et al. in U.S. Pat. No. 5,367,588 teaches FBG fabrication by a phase mask. The method improves the optical stability over the holographic interference technique, by employing a microstructured diffractive phase mask to create two interfering laser beams from one beam, but only in the proximity of the phase mask device. However, this method is inflexible in comparison with the holographic method, for example, when multiple wavelength Bragg grating devices are required. Separate generally high-cost phase masks are required for each Bragg wavelength, and relatively time-consuming multiple laser exposures with various the phase masks are then necessary to produce the desired multi-wavelength spectral response. This phase mask technique also requires an existing waveguide and uses an ultraviolet light source.

Further, Albert et al. in U.S. Pat. No. 6,256,435 teaches a method of forming Bragg gratings in a planar lightwave circuit ("PLC"). The technique has a disadvantage over the formation of FBGs in that Bragg gratings formed in planar lightwave circuits have weaker reflection due to lower photosensitivity of glass materials contained in the planar light circuit.

These various techniques of Bragg grating fabrication in optical materials can be generally classified as one-dimensional (1D) in the case of FBG and two-dimensional (2D) devices in the case of PLCs.

Laser direct writing, for example with femtosecond duration laser pulses, define a new methodology for generating various types of photonic devices internally in bulk transparent material, with laser interactions confined in or near the laser focal volume. In this way, three-dimensional (3D) photonic devices may be fabricated. Various types of lasers are used to alter the refractive index of a material in bulk materials, for example, to create buried waveguides, in a manner that is well known.

For example, see Mourou et al. in U.S. Pat. No. 5,656,186, which describes ultrashort laser interactions with materials. No internal waveguide writing in bulk material was described.

Davis et al. in "Writing waveguides in glass with a femtosecond laser," Opt. Lett. 21, 1729-1731 (1996) discloses a method of forming buried optical waveguides with ultrashort duration lasers.

Wei et al. (see M. Wei, K. P. Chen, D. Coric, P. R. Herman, J. Li, $F_2$-laser microfabrication of buried structures in transparent glasses, *Photon Processing in Microelectronics and Photonics*, SPIE Proc. 4637, Photonics West, 20-25 Jan. 2002, p. 251-257) presents an alternative means of forming buried optical waveguides in transparent glasses that also employs scanning of a focused laser beam, but with much longer laser pulse duration of approximately 15 nanoseconds.

Borrelli et al. in U.S. Pat. No. 6,977,137 (2005) discloses waveguide writing in three dimensions and various devices.

Such ultrashort laser writing of optical circuits is promising as a fabrication method for creating compact optical circuits by forming devices in multi-layers or other geometries exploiting the full 3D physical space in comparison to planar light circuits (2D) or fiber optics (1D). Various devices such as power splitters, directional couplers, and multi-mode interference (MMI) power splitters are possible. However, a roadblock in the development of such 3D laser writing processes has been the inability to generate basic grating filter/reflectors devices within the 3D waveguide structures formed by the laser writing method.

Mihailov et al. in U.S. Pat. No. 6,993,221 teaches the combination of ultrafast laser and phase mask exposure to generate short-pulse laser interference inside the waveguide core of an optical fiber and thereby form a permanent refractive index change with characteristic period greater than half of that of the mask. However, this technique has only been demonstrated to be successful in a pre-existing waveguide (optical fiber).

Kalachev et al. in Journal of Lightwave Technology 23, 8, 2568-2578 (2005) discloses a femtosecond ultraviolet light source method for fabricating a long period fiber grating in pre-existing waveguide. However, this point-by-point method only provides low spatial modulation and therefore is very limited in the type of gratings that can be formed. This technique also requires an existing waveguide for laser formation of a grating.

Martinez et al. in "Direct writing of fiber Bragg gratings by femtosecond laser", Electron. Lett. 40, 19 (2004), describes point-by-point writing of FBG with a femtosecond laser (150 fs, 1 kHz). The method employs a scan technique, but requires also an existing waveguide in the fibers.

Laser waveguide writing in crystalline materials was demonstrated by Nolte et al. in "Waveguides produced by ultrashort laser pulses inside glasses and crystals", Proc. of SPIE Vol 4637, 188-196 (2002), and "Femtosecond writing of high quality waveguide inside phosphate glasses and crystalline media using a bifocal approach", Proc. of SPIE, vol. 5340, 164-171 (2004), and discloses waveguide formation in crystalline materials. See also PCT No. WO 2005/040874 to Khruschev et al.

There are also examples of longer pulse duration lasers (<1 ms) being successfully applied to 3D fabrication in optical materials, for example, of volume gratings (for example, see J. Zhang, P. R. Herman, C. Lauer, K. P. Chen, M. Wei, 157-nm laser-induced modification of fused-silica glasses, in *Laser Appl. in Microelectronic and Optoelectronic Manuf. V*, SPIE Proc. 4274, Photonics West, 20-26 Jan. 2001, pp. 125-132) or buried optical waveguides (for example, see M. Wei, K. P. Chen, D. Coric, P. R. Herman, J. Li, $F_2$-laser microfabrication of buried structures in transparent glasses, *Photon Processing in Microelectronics and Photonics*, SPIE Proc. 4637, Photonics West, 20-25 Jan. 2002, p. 251-257.), although combination of gratings and waveguides were not demonstrated.

Yamaguchi discloses in Japanese Patent Application No. (2000)-144280 a laser method to generate an optical waveguide in doped glass with first-order Bragg gratings responses. The Bragg responses are induced during laser scanning by periodically changing the intensity of the laser light, the diameter of laser light at the focusing point, or relative moving speed to generate relatively smooth waveguides with periodic modification of refractive index.

In summary, there has been considerable development in the fabrication of optical/photonic circuits by pulsed lasers. The basic grating fabrication techniques, including (i) the use of amplitude/phase masks, (ii) holographic interference of two beams, and (iii) point-by-point grating writing, suffer from numerous disadvantages, including being expensive, time-consuming, and not readily applicable to 3D application. Furthermore, most known optical devices have been based on smoothly connected optical waveguides, absent of periodic structures, or where grating structures have been desired the fabrication techniques have relied upon existing waveguide structures before fabricating gratings. On the basis of the foregoing, what are needed are optical devices comprising gratings structures and waveguides and an improved means of fabricating same.

SUMMARY OF THE INVENTION

The present invention provides optical devices and methods for their preparation comprising waveguide writing and grating fabrication.

In an aspect of the present invention, a method is provided for simultaneous point-by-point fabrication of gratings or other periodic structures and waveguides in a transparent substrate by a laser means.

In another aspect of the present invention, a periodic structure is provided, formed by linking individual laser modified volumes in a transparent substrate with pre-determined distances that function as both gratings and a waveguiding structure. (This structure is referred to herein as a grating waveguide, or "GW".)

In an embodiment of the present invention, a pulsed laser is used to alter the refractive index of a transparent material and create a periodic structure therein. By controlling the scan speed during laser writing and optimizing the laser exposure parameters, isolated or near-isolated laser-modified volumes can be formed in the transparent material with arbitrary periodic spacing that (i) define a low loss optical waveguide that can be scanned flexibly in any 3D path through the media, and (ii) simultaneously superimpose a periodic or chirped grating that provides a controlled spectral response for reflection, diffraction, and/or transmission within any section of the waveguide. The grating periods can be varied to form highly complex optical circuits in relatively short period of time. The method also provides for apodization and aperiodic chirping of the grating structures by various means, for example, by tuning the relative scanning speed or the laser intensity during the point-by-point fabrication.

Advantageously, the method of the present invention enables 3D fabrication and integration of sensing and filtering functions in 1D, 2D, and 3D optical circuits. Because only one laser writing step can be employed, the method of the present invention simplifies the fabrication process which leads to lower cost and enables highly versatile optical devices or systems to be designed and fabricated.

BRIEF DESCRIPTION OF THE DRAWINGS

A detailed description of embodiments of the present invention are provided herein below by way of example only and with reference to the following drawings, in which.

Figure 1A:
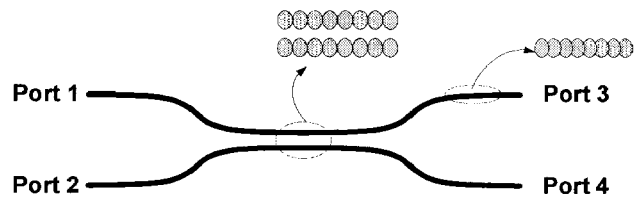
FIG. 1 illustrates schematics of example devices incorporating the GW structures of the present invention: (a) symmetric directional couplers which serve as add/drop devices; (b) asymmetric direction coupler for spectral shaping of add/drop devices (c) splitter (Y junction) with filtering function; (d) asymmetric splitter that have GW structures of different period or different size (refractive index changes) on the two branches; (e) ring resonator comprising of GW structures and coupled to a second GW waveguide; (f) ring resonator comprising of asymmetric coupling between the GW ring and a straight GW waveguide, with different period, size or value of refractive index volume; (g) an apodized GW Bragg reflector within a GW of different resonance; (h) a GW mode converter; and (i) a chirped GW for dispersion compensation.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE INVENTION

The present invention provides a method of forming Bragg gratings or other periodic structures and waveguides simultaneously by laser pulses to enable the fabrication of optical circuits. This present invention provides a structure that has the combined functions of a waveguide and a periodic structure, in particular, a grating. Advanced photonic devices can be prepared incorporating the grating waveguide, or "GW", structures to realize novel functions.

As discussed more fully in the non-limiting examples below, this single-step, direct-write process of GWs permits optical waveguides to be formed simultaneously with gratings or other periodically or aperiodically modulated optical devices that presently require two separate process steps. The novel structure consists of partially or non-overlapping laser modified volumes, which could find applications as filters, photonic bandgap structures, controllable defects, metamaterials, and so on. This production convenience offers relatively lower production cost and faster fabrication time. Grating periods can be varied to any desired value to form highly complex optical circuits in seconds while conventional techniques would take many hours or not even be possible. The method enables highly functional optical circuits to be fashioned in compact 3D geometries, enhancing the performance over today's devices and enabling many new optical devices to be considered for new markets because of lower fabrication costs.

Advantageously, this novel technique can form a variety of single or multi-mode waveguides together with a variety of gratings and generally any type of periodic optical structures inside transparent media. In this way, highly functional 3D photonics circuits, including 'Bragg grating sensor networks', can be easily fabricated that enable many new 3D combinations of integrated functions. Meanwhile, because this is a one-step fabrication technique, the fabrication process is much faster and cheaper than traditional techniques where at least two fabrication steps are required.

Advantageously, the powerful and controllable laser interactions yield strong photosensitivity response, which is unlike most laser grating writing methods used today. No photosensitization enhancement is required.

The method immediately applies to the fabrication of optical sensors or filters which are widely used in biological, structural, physical, electrical and many other forms of optical sensing. The present invention is also positioned to serve the optical communication market by providing lower cost optical multiplexing, add/drop, and laser mirror devices that enable lower cost procedures for integrating more optical devices into smaller and more robust packages. The immediate application is short-haul coarse wavelength division multiplexing systems and semiconductor laser distributed mirrors. Other potential applications include the fabrication of optical backplanes for computers and chip-to-chip optical communication systems on hybrid electric-optical circuit boards that are expected to emerge in the near future.

It should be expressly understood that different lasers can be implemented in writing the grating waveguides of the present invention, including but not limited to: (i) pulsed laser sources, including pulsed ultrashort, extreme ultraviolet, ultraviolet sources, etc.; and (ii) modulated continuous laser sources, as an example, modulating the amplitude of a continuous $CO_2$ laser periodically will also give a pulse-like performance.

It should also be understood that the present invention is not limited to any particular scanning technique for the laser. For example, the use of galvanometer or prism or polygon or acousto-optic beam scanner as the effective turning mirror in the laser beam delivering path is one means of moving the laser focus spot relative to the bulk material. In another embodiment, the sample may be moved within a stationary focal volume. In yet another embodiment, a technique combining moving the sample and the beam may be employed.

Further, the present invention contemplates writing grating waveguides in a variety of materials, including: (i) various types of glass; (ii) polymers; (iii) crystals, including lithium niobate, doped/undoped sapphire, KGW, BBO, LBO, etc.; (iv) semiconductors, including silicon, gallium arsenide, indium phosphide, germanium, etc.; or (v) any other type of material which can be processed by laser in accordance with a method described herein.

Figure 1B:
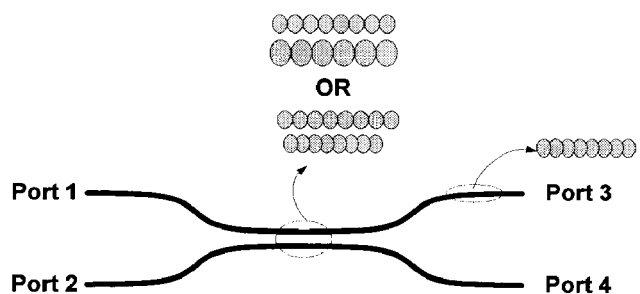

The present invention can be implemented to fabricate a plurality of optical devices, including, as an example, the directional couplers shown in FIG. 1(a). By using slightly different scan speeds in the center coupling region with respect to the rest of the structure, light with similar wavelength as the Bragg wavelength of that region $\lambda_B$ will only be reflected by the center. Then the coupling length of the coupler could be designed to realize add/drop function in optical communication: for all light entering port 1, only light with wavelength very near $\lambda_B$ will be reflected and dropped at port 2, while the rest of the light at other wavelengths will pass to port 4. Further, for all light entering port 3, only light with wavelength very near $\lambda_B$ will be reflected and dropped at port 4, while the rest will pass to port 2. Further, an asymmetric coupler with different GWs responses in the top center and bottom center part of the coupler due, for example, to different separation (period) or different sizes or different refractive index changes, as illustrated in FIG. 1(b), will render similar performance, but additional possibilities for spectral shaping of the coupler response.

Figure 1C:
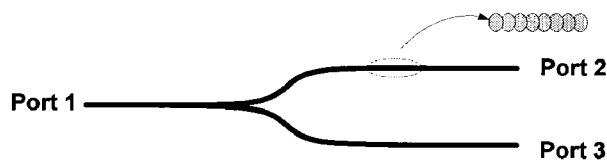
Figure 1D:
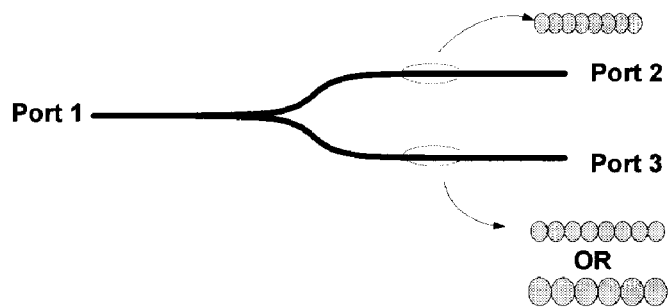

The invention can also be used to fabricate a symmetric splitter with filtering function, as illustrated for the symmetric splitter in FIG. 1(c). Light with the Bragg wavelength of the top or bottom branch of the structure will be reflected back to port one. If the Bragg wavelength of the two arms are designed to be different, for example by varying scan speed or laser intensity, then the output light in port 2 and port 3 will separate the light with different intensity ratios at different spectral regions—the corresponding Bragg wavelength of one arm will reject light at the Bragg resonance while the other arm will pass the same wavelength in an asymmetric splitter as shown in FIG. 1(d).

Figure 1E:
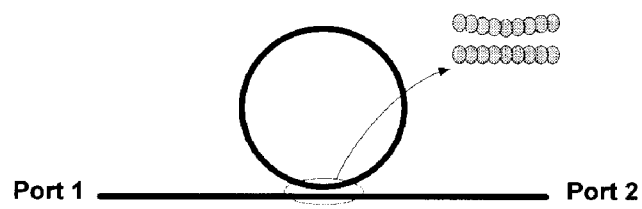
Figure 1F:
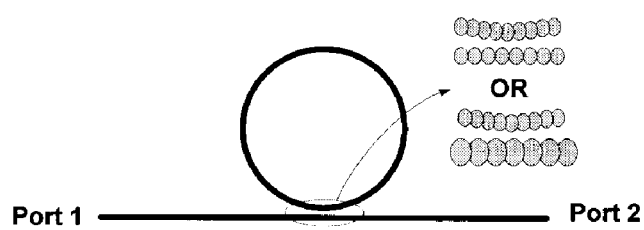

Another example device based on the present invention is the ring resonator structure shown by FIG. 1(e). The coupling length and waveguide separation defined by the GW ring and GW waveguide could be designed to reject a particular wavelength $\lambda_B$ while also delaying the remaining light that would normally couple into the ring resonator. The interference between the GW $\lambda_B$ and the wavelength resonance of the ring resonator permits new means of spectral shaping control of the delay response of the loop with respect to coupling from and back to the straight GW waveguide. In this way, a delay line filter for the particular wavelength $\lambda_B$ is defined as one example of application where all the wavelengths other than $\lambda_B$ are delayed. An asymmetric ring structure can also be made if the GWs in the ring and the straight waveguide have different GW responses due, for example, to different separation or different sizes or different refractive index changes, as illustrated in FIG. 1(f).

Figure 1G:
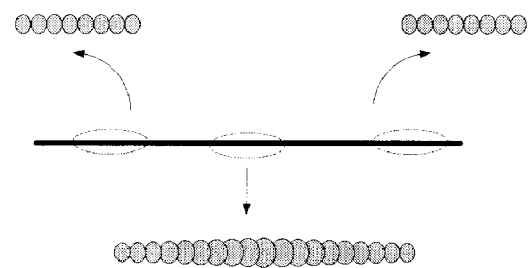

The invention can also be used to fabricate apodized GW as shown in FIG. 1(g). The peak intensity of the scanning laser could be modulated as a sinc-squared function so that the size or index changes of the laser modified volumes follow the same modulation. This way, an apodized GW can be realized with spectral shaping control function, by means well known to optical practitioners.

Figure 1H:
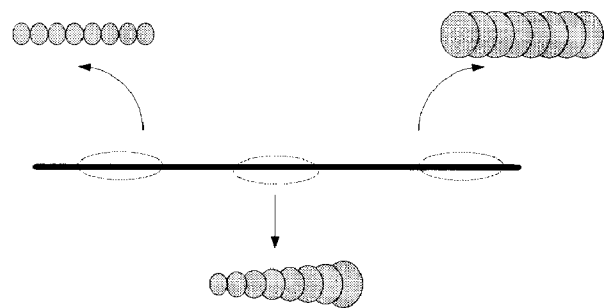

Another device that can be made using the current invention is the mode converter as shown in FIG. 1(h). By fabricating a central segment of GW with smoothly varying GW response, adiabatically mode conversion is possible in matching the modes and providing high coupling for light entering port 1 in one type of GW segment and exiting at port 2 in another type of GW segment.

Figure 1I:
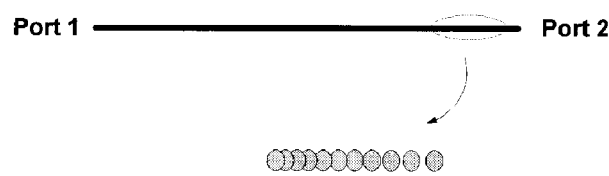

In addition, by adiabatically increasing or decreasing the separation among the laser-modified volumes, which could be realized, for example, by accelerating or decelerating the scanning stages supporting the sample during the exposure, a chirped GW can be made to realize the function of dispersion compensation in optical communication systems because light with different wavelength will be reflected at different GW positions and the dispersed pulse will be compressed to its original width on time domain (see FIG. 1(i)).

Other photonics devices are contemplated by the present invention, including, for example, the creation of distributed sensor networks composed of a mesh of GWs with various periods written inside a bulk material so that local stress, strain or temperature could be pinpointed to every position where a physical process happens. Other applications include 2D arrays of laser modification volumes that define planar waveguides with embedded gratings. Another application includes 3D arrays of laser modification volumes that define large volume light guiding paths, for example, multi-mode waveguides or photonic bandgap structures, all characterized by embedded gratings. The application of the present invention to alternative devices will be readily apparent to a person of skill in the art.

It should be understood that in accordance with the present invention "single pulse" exposures can be considered as "single energy units" comprising of temporal pulse profile of any shape or more than one divided pulses. Each of the refractive index voxels that compose the GW devices can hence also be formed by multiple smaller laser pulses, a burst of laser pulses, or similar representations of other energy sources. Non-limiting examples of pulse shapes include Gaussian, super Gaussian, Lorentzian, modified Lorentzian, flat-top, Voigt, and symmetric and asymmetric variations thereof, and including single or multiple spikes, long tails, and unusual profiles. As an example, the pulse may consist of a 100 fs peak, followed by a 1 ps long tail, or comprise of multiple short pulses (i.e. 5 fs to 10 ps duration) repeated several times in short or long duration envelop (50 fs to 100 ns).

The present invention may be further illustrated by the following non-limiting examples.

EXAMPLE 1

Figure 2:
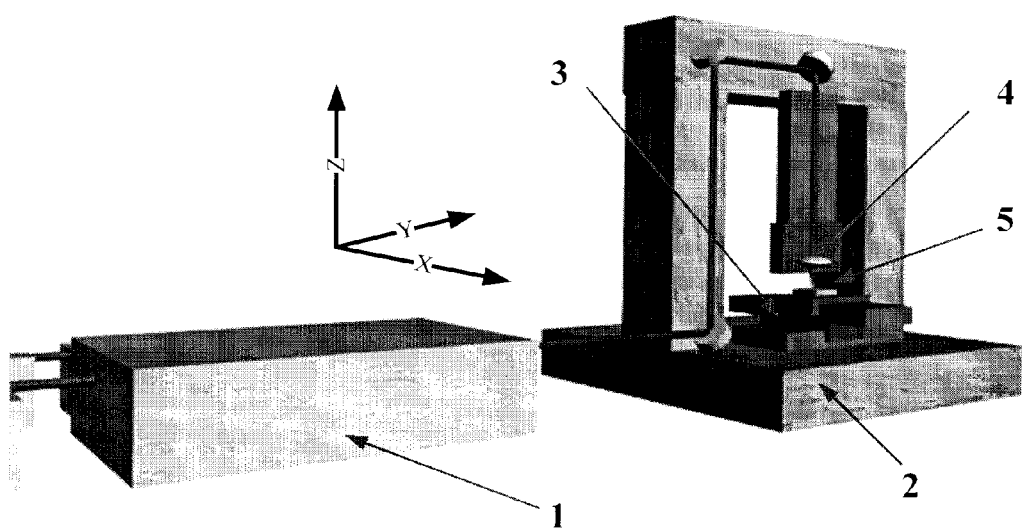
FIG. 2 illustrates a laser writing arrangement in accordance with one embodiment of the present invention.

FIG. 2 depicts a laser writing arrangement in accordance with one example embodiment of the present invention. The laser is delivered to the sample by mirrors and a focusing lens. In this embodiment, the sample is mounted on a two-axis motion stage for horizontal scanning in x or y direction while a vertical motion stage positions the lens to focus the beam at a controlled depth below the surface of the material where modification is confined inside or nearby the laser focal volume.

In this particular embodiment of the present invention, a pulsed ultrashort (<10 ps) laser (1) is used to deliver 1 kHz pulses with 35 fs minimum duration and 2.5 mJ maximum per pulse energy. The laser beam was relayed to a granite structure (2) in which a 3D air-bearing motion stage system (2) is mounted. The beam coming from the Z direction (optical axis) was then focused by a 0.25NA aspherical lens (4) to ~200 µm below the surface of a glass sample (Corning EAGLE2000™) (5) of 50×50×1 mm$^3$ size which is fixed onto the stages. The sample was then traveled on x or y axis with pre-designed speed perpendicularly to the incoming laser beam (z axis). The photonic device/structures are formed by scanning the sample with respect to the laser spot, with pre-determined laser parameters (e.g., power, pulse duration, scan speed, focus depth, etc.). In this example, the pulse duration of the laser was 320 fs, the per pulse energy was 3 µJ, and the scan speed was varied between 0.1 to 10 mm/s.

Although this particular example uses ultrashort pulses, it should be understood that the present invention contemplates using various pulse durations (e.g., µs, ns or ps) depending on, inter alia, the substrate material and laser parameters.

Figure 3:
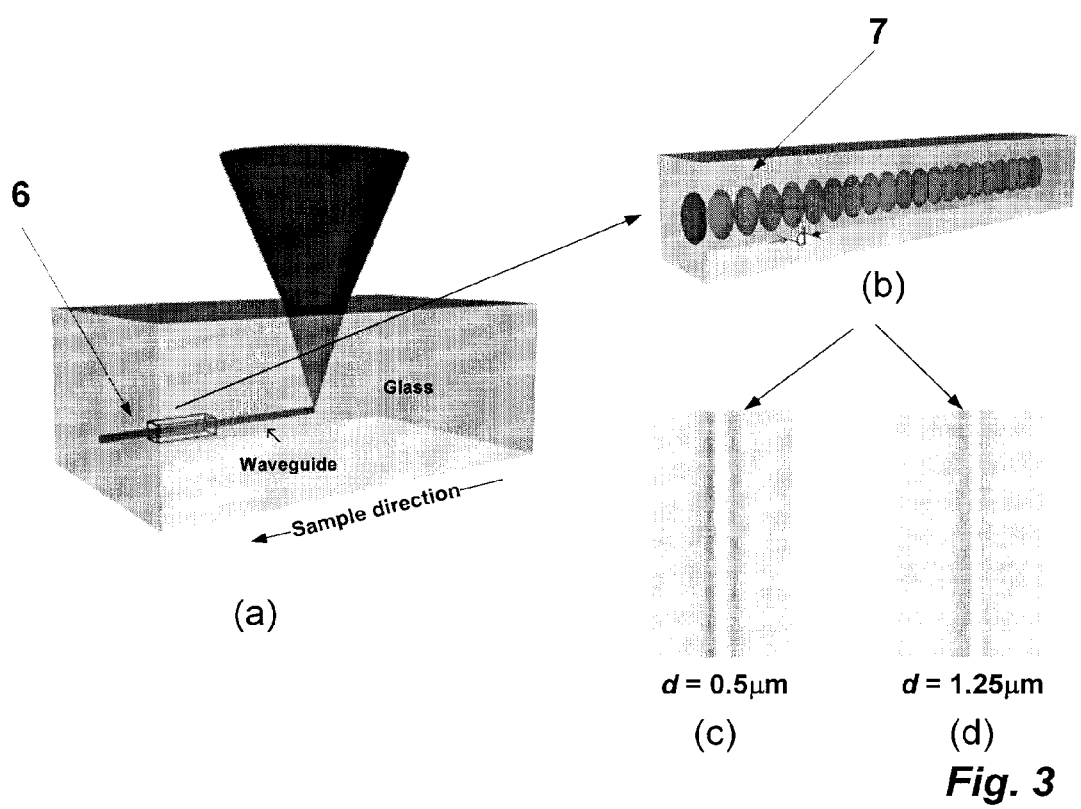
FIG. 3 is a schematic illustration of: (a) the waveguide fabrication process with the sample translated perpendicularly to the focused laser beam direction; and (b) leading to an array of isolated focal volumes under high (i.e. approximately 1 mm/s) scan velocities for a 1 kHz repetition rate laser; and (c) and (d) show transverse microscope images of waveguides in glass written with 320 fs pulse duration, 3 µJ/pulse energy, with scan speeds of 0.5 and 1.25 mm/s, respectively.

As illustrated in FIG. 3, a modified track (6) with raised refractive indices composed of isolated or partially isolated volumes was formed inside the CORNING EAGLE2000™ glass. The combination of the pulsed laser and moving sample produced a buried periodic structure comprising the individual laser interaction volumes (7) which guides light as a single mode waveguide while also acting as a grating, particularly a 1D Bragg grating. In other words, the GW structure formed serves both as an optical waveguide and an optical filter/reflector. Altering the scan speeds of the laser alters the point-by-point distance d of the periodic interaction volumes, thereby controlling the Bragg wavelength of the device. The overhead microscope pictures of two GWs written with 0.5 and 1.25 mm/s velocity which correspond to 0.5 µm and 1.25 µm spot-to-spot separation distances, respectively, are shown in FIGS. 3(c) and 3(d). When the scan speed is low (0.5 mm/s), the track appears more connected as the optical microscope cannot resolve the 0.5 µm modulation along the length. With larger scan speed, the separation of the isolated volumes are visible with an optical microscope. In other words, isolated laser-interaction volumes are seen to partially overlap at a small separation distance d (shown in (c)), or define highly isolated modification volumes when d is made larger by faster scan speed (shown in (d)).

In this particular example, the laser parameters for GW formation in fused silica (discussed below), comprise a scan speed of 0.1 to 2 mm/s, corresponding to 100 nm to 2 µm point-to-point separation of individual laser interaction volumes. In this example, first order GWs at 1.5 µm telecom wavelength can be achieved with a scan speed of near 0.5 mm/s in CORNING Eagle2000™ glass, which has a refractive index of near 1.5. The waveguides appear uniform under an optical microscope (at resolution limit, e.g., FIG. 3(c)), but periodic modulation is expected. The pulse duration of the ultrashort source is also important in order to optimize the GW performance. In this embodiment, the applied pulse duration was varied from 40 fs to 10 ps, and positively chirped 320 fs duration pulses were found to produce low loss waveguide and high response grating filters than other durations from 40 fs to 10 ps. This sharply contrasts the optimum GW writing pulse duration of 1 ps in the fused silica glass (as discussed in example 2 below), which indicates that optimum laser writing conditions change with respect to the material.

The above examples (EAGLE2000™ and fused silica) demonstrate that pulse duration is an important optimization parameter for controlling the performance of GW devices. The optical pulse duration is dependent on the substrate material in question, as well as other parameters, e.g., the laser wavelength, pulse shape (spatial and temporal), focussing conditions (i.e. numerical aperture) and the scan rate. Other laser parameters, such as the wavelength of the laser, the temporal shape of the pulse or the presence of multiple pulses, are also key parameters to optimize toward various materials in question. For example, the optimum condition for other materials might occur when the laser wavelength is in the range of 157 nm of the $F_2$ laser to longer than 10 µm of the $CO_2$ laser, and the pulse duration in the range of 1 fs to 1 ms duration.

Figure 4A:
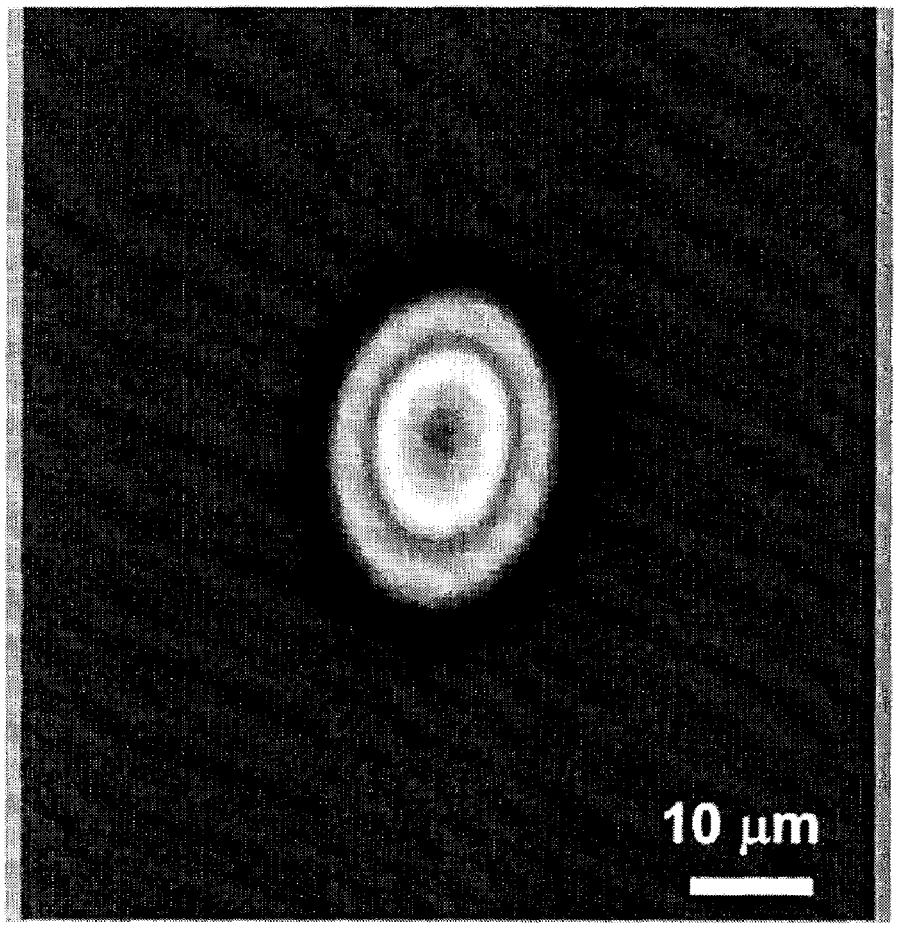
FIG. 4 illustrates (a) the near field mode profile of the 1550 nm light guided in a laser-formed grating waveguide, and the (b) vertical and (c) lateral linear plots of the intensity profile together with a Gaussian-representation (represented by the smoother line) of the profile for a grating waveguide of the present invention.
Figure 4B:
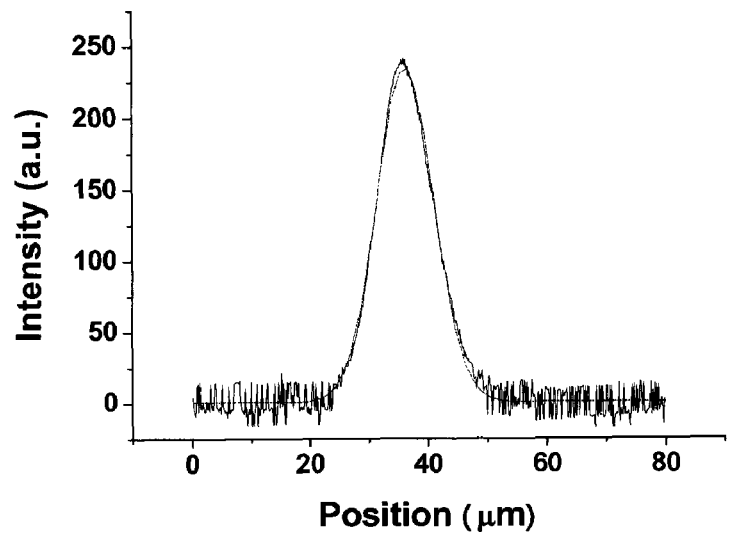
Figure 4C:
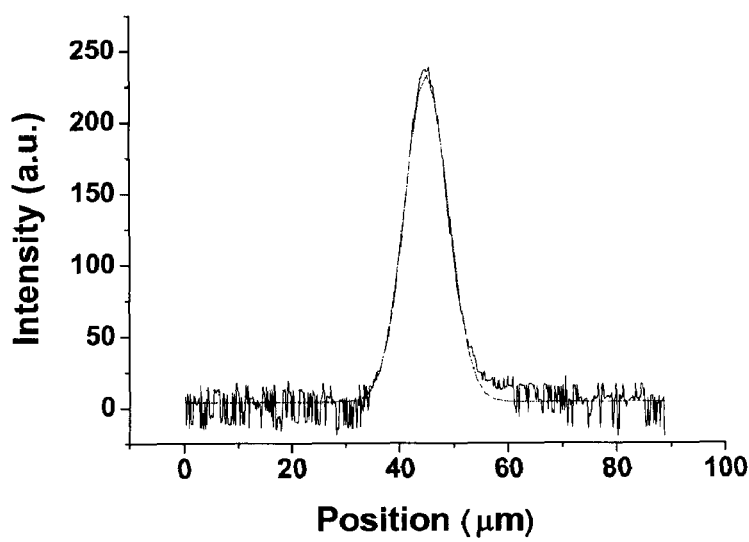

Using a laser with 320 fs pulse duration and 3 µJ per pulse energy, the GW written in CORNING EAGLE2000™ with ~0.5 mm/s scan speed and 0.25 numerical aperture focusing lens exhibited a single mode intensity profile with a propagation loss of ~0.6 dB/cm and a mode diameter at $1/e^2$ intensity of 16 µm×18 µm (FIGS. 4a, 4b and 4c). The mode profiles are well represented by Gaussian distributions (FIGS. 4b and 4c), indicating the laser formation of a relatively high ~$10^{-3}$ refractive index change with only a single laser pulse irradiation of each isolated modification zone. Because of the relatively large optical mode diameter in comparison with a 10.5 µm mode size for standard single-mode optical fiber, the mode-mismatch of the fiber to the waveguide yielded a coupling loss of ~1 dB per facet inferred for the example in FIG. 4(a). However, mode diameter is controllable by the laser parameters, focusing geometry and scanning method, and could be improved to better couple into standard single-mode optical communication fiber or other fiber types, including multi-mode fibers. Free-space coupling or grating coupling are alternative methods for low-loss optical coupling. This example of coupling efficiency is commercially acceptable for some sensor applications and, with optimization of laser exposure conditions, can be further improved by someone experienced in the art of laser fabrication and optical engineering to meet criteria for several telecommunication applications.

Figure 5:
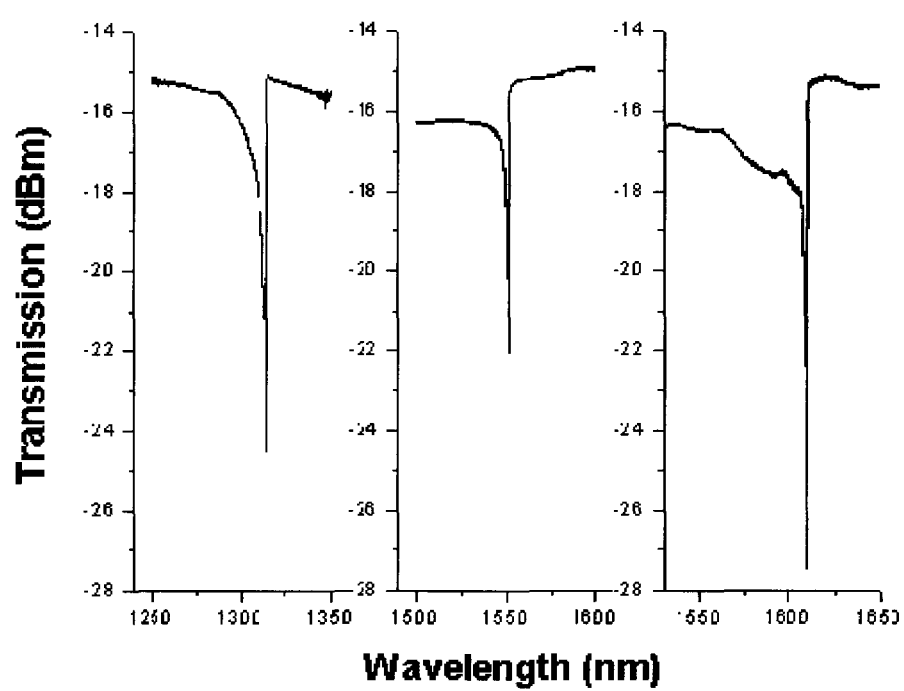
FIG. 5 illustrates the transmission spectra recorded from various grating waveguides formed in glass with a laser of 3 µJ pulse energy, 1-kHz laser repetition rate and 320 fs pulse duration while scanning the sample at scan speeds of 0.44, 0.52 and 0.54 mm/s (left to right, respectively).

FIG. 5 illustrates the transmission spectra of three examples of 50-mm long GWs written with a 0.25 NA lens, 3

µJ per pulse energy, and 320 fs pulse duration in Corning Eagle2000™ glass. By altering the scan speeds (the three GWs have 0.44, 0.52 and 0.54 mm/s scan velocities), the Bragg wavelengths were demonstrated in first order diffraction at approximately 1310 nm, 1500 nm and 1610 nm, respectively, and demonstrate tuning from ~1300 nm to ~1600 nm. By this means, the Bragg grating wavelength has been demonstrated to easily cover the whole optical communication band, and extension to visible, ultraviolet, and far infrared spectral regions is expected with simple modification of laser, focusing, and scanning parameters.

Figure 6:
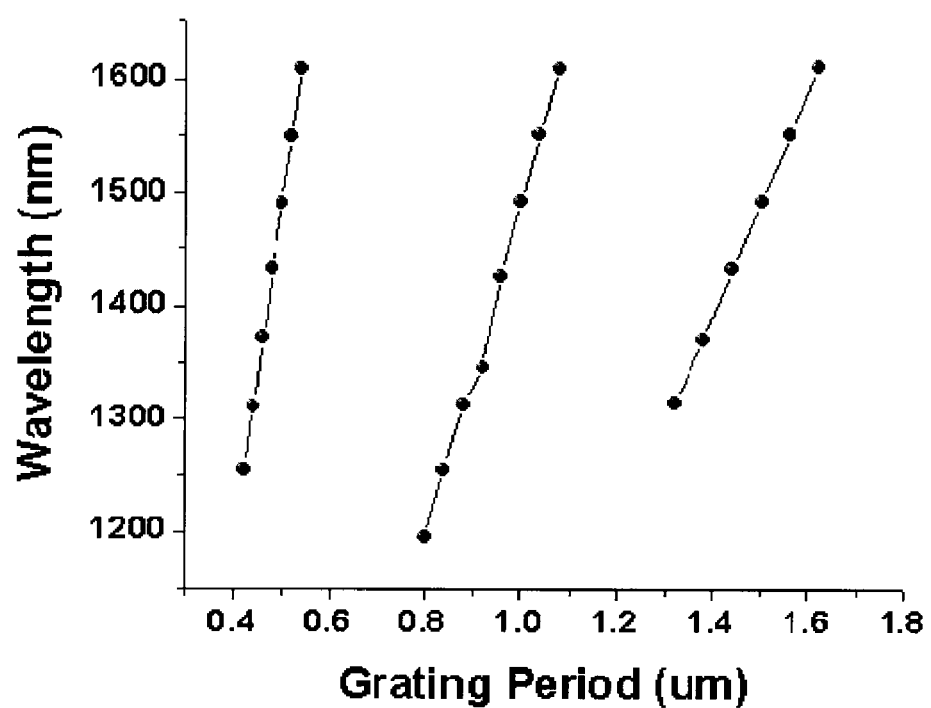
FIG. 6 illustrates the controllable selection of Bragg resonance wavelength (nm) of grating waveguides versus scan velocities.

FIG. 6 illustrates the dependence of measured Bragg reflection wavelength verses the grating period of the GWs. The periods of the GWs can be derived easily by the following calculation: modulation period is equal to the scan speed divided by the repetition rate (i.e. 1000 Hz). The three curves represent the $1^{st}$, $2^{nd}$ and $3^{rd}$ order Bragg grating (left to right in figure) while the scan speed is changed from 0.4 to 1.8 mm/s. The Bragg grating wavelength is controllable in different orders as seen by the decreasing slopes of the data points.

As discussed above, the present invention comprises the first demonstration of grating structures (specifically Bragg gratings) in 3D waveguides. The devices are prepared via a unique single-step laser writing process. The present invention is advantageous because no tedious time-consuming multiple alignment and exposure steps are required. Further, the gratings cover the entire optical communication band. Extension to visible spectrum or longer wavelengths is simple and only requires light sources and diagnostics that cover the appropriate spectrum of interest for development.

Figure 7:
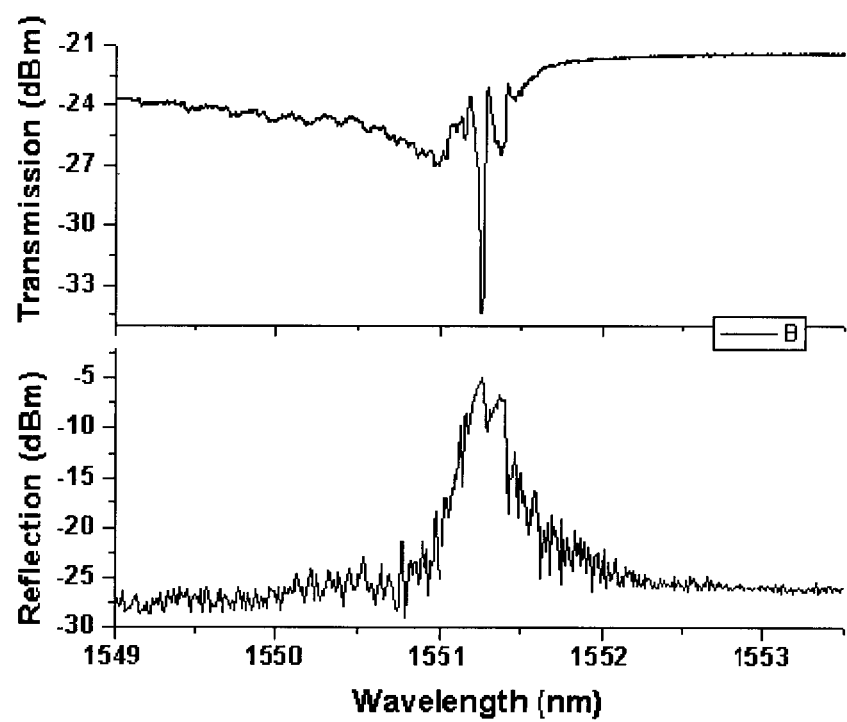
FIG. 7 illustrates the reflection (bottom) and transmission (top) spectrum with a Bragg resonance wavelength in grating waveguides formed in glass with a 3 µJ, 1 kHz laser, yielding an 11 dB, 0.04 nm (full-width, half maximum, or "FWHM") transmission spectral dip and 0.42 nm FWHM, 22% (6.65 dB) reflection peak.

As shown in FIG. 7, a higher resolution spectral response of a GW written with 0.25 NA lens, 3 µJ per pulse, 0.52 mm/s scan speed is as follows: (i) transmission spectrum has a 11 dB dip at 1551.2 nm with 0.04 nm width (FWHM); and (ii) the reflection spectrum is 0.42 nm wide (FWHM) and with a 22% maximum reflection at the same wavelength. The ~10 dB transmission rejection and 22% reflection provides sufficient optical signal of value for several device applications such as filters and sensors. The present invention can be applied to fabricate greater than 30 dB filter devices (99.9% to 1% contrast) that meet many application needs. Various types of filter responses and sensor networks can be fabricated. Novel applications involving 3D sensing/filtering functions and algorithms may be designed based upon this technique with broad applications. The grating strength, for example the Bragg grating reflection, can be controlled by laser exposure conditions. For example, a combination of cylindrical and spherical lens can provide asymmetric optical focusing that elongates the laser spot size transversely to the waveguide such that the extended modified index interface captures more of the transverse guiding mode cross section to improve the reflection.

Figure 8A:
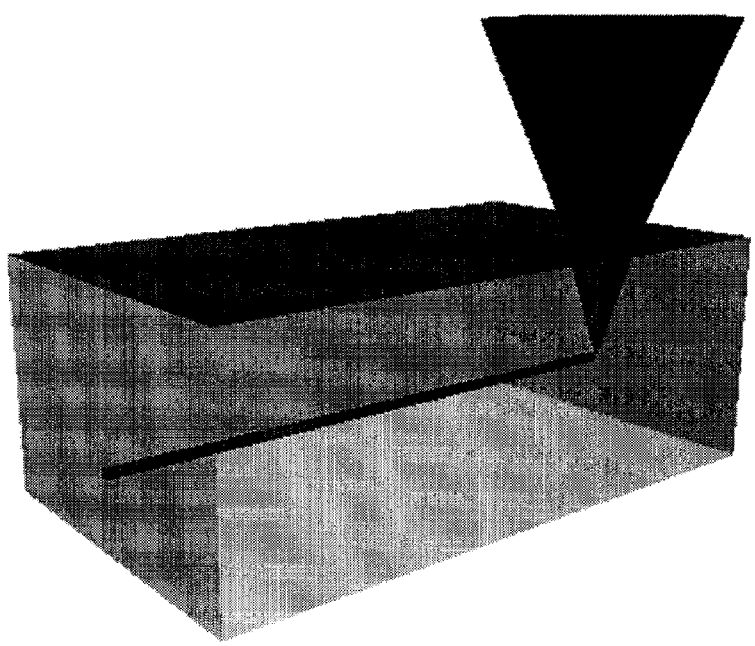
FIG. 8 illustrates schematically in (a) a serial GW device with four different Bragg grating components that together comprise a GW sensor network. The four GW segments were formed with four nearly identical scan velocities of 0.5168, 0.5201, 0.5235, and 0.5268 mm/s, yielding four evenly spaced Bragg grating resonances seen in both transmission (b) and reflection (c) spectral recordings. The device is made by one single scan with three abrupt velocity changes during the scan.
Figure 8B:
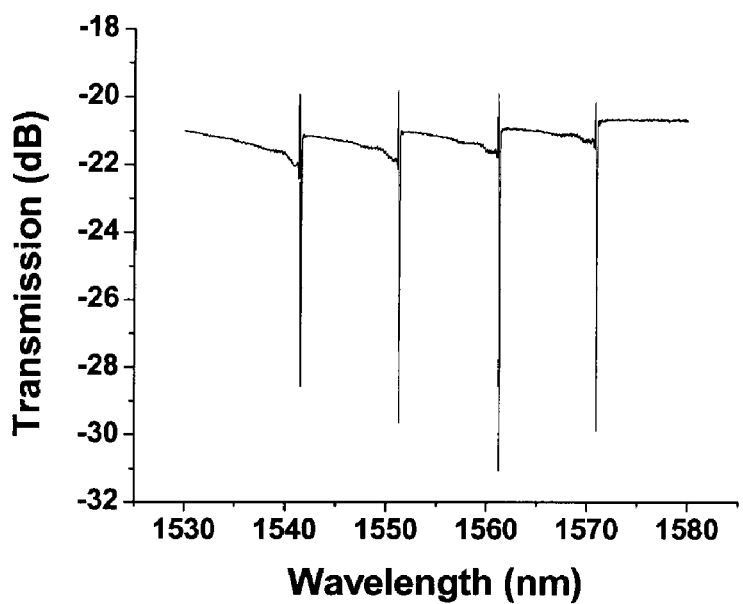
Figure 8C:
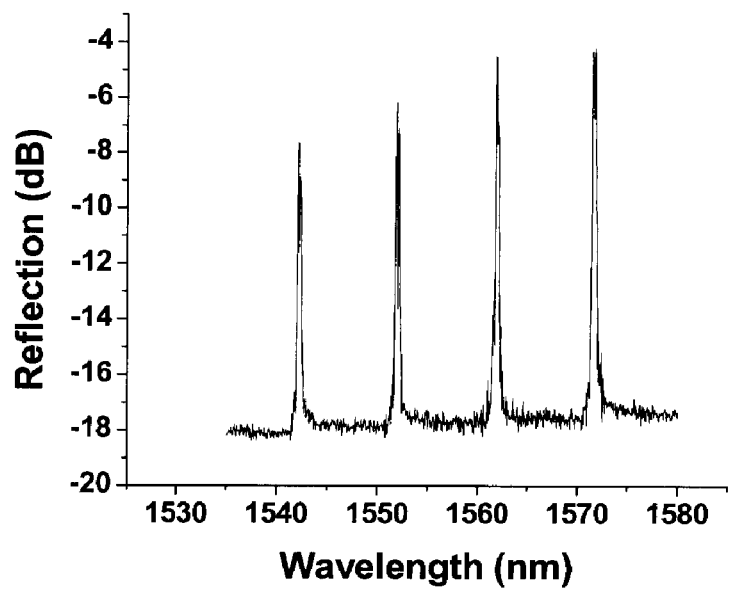

The method of the present invention can be used to fabricate grating sensor networks with simple means of on-the-fly adjustment of the scan speed, laser pulse energy, laser polarization, focal depth, and acceleration control of the beam focal position relative to the sample. For example, a device having four different Bragg gratings in series was produced in a single linear waveguide (FIG. 8(a)). The gratings were differentiated along the same waveguide by abruptly changing the scan speeds three times during the scan. The GW is 50 mm long in total with four 12.5 mm long segments exposed with scan speeds of 0.5168, 0.5201, 0.5235, and 0.5268 mm/s. It is simple to fabricate even more gratings, or to curve waveguides and layout multiple levels of interconnected grating devices in parallel and/or series. The strength and spectral response of each grating can be independently adjusted. The manufacture of optical systems or networks in this manner has various applications in sensing and telecommunications devices. FIGS. 8(b) and 8(c) depict the spectra of four-wavelength Bragg filter reflectors as observed in reflection from a single straight waveguide comprising of four different segments with spot-to-spot spacing of 516.8, 520.1, 523.5 and 526.8 nm. These spacings were precisely controlled by the scan speed.

This multiplexed device was formed in a single laser scan in less than 2 minutes. Traditional fabrication techniques would have required at least five steps: one to form a waveguide and then four separate laser exposures to overlay a different Bragg grating in the waveguide to produce a different resonant wavelength. The traditional technique requires one expensive phase mask to form a FBG at each desired wavelength. The processing time is several hours, in comparison with approximately one to two minutes for the method of the present invention.

Fabrication of GW structures with higher repetition rate systems, for example, 100 kHz systems, can also be realized by moving the sample with 100× faster speed than the 1 kHz case, which is near 100 mm/s. The implementation of a high-repetition system will greatly increase the efficiency of the writing process.

EXAMPLE 2

GW structures were fabricated by partial or non-overlapping pulses of the same 1 kHz ultrashort laser in fused silica glasses. When focused by a 0.25 NA aspherical lens and scanned with ~1 mm/s velocity relative to the bulk fused silica glass (50×50×1 mm³), the pulsed laser produced low loss (minimum ~0.2 dB/cm) waveguides for guiding visible light (633 nm wavelength). The GW structures are similar to the GW structures discussed in example 1 above. However, the laser interaction processes for fused silica are distinguishable in one aspect: the GW structure made in fused silica glass can guide visible wavelength with very low loss compared with the low loss infrared-guiding behaviour in the example above. Further, an examination of a wide 50 fs to 5 ps range of laser pulse duration shows the lowest loss waveguides to form in a narrow 1.0±0.2 ps window. This low-loss processing window has not been previously reported and such relatively long pulse duration significantly exceeds the 50-200 fs duration previously reported as ideal for low-loss waveguide formation in fused silica with femtosecond laser systems. The waveguides comprise of an array of nearly isolated single-pulse interaction volumes that function in the same way as the GWs described in example 1 for visible wavelength. A minimum propagation loss of ~0.2 dB/cm and a slightly asymmetric mode diameter of ~9 µm were observed for 633 nm light. The demonstration of low loss GW structures in fused silica fabricated with picosecond pulses enables 3D photonics circuit fabrication with simpler and lower cost picosecond laser systems.

The Bragg grating waveguide structures were written with a pulsed laser that delivers 800 nm wavelength light with 2 mJ maximum energy at 1 kHz repetition rate. The pulse duration was varied from 50 fs to 5 ps by tuning the compressor grating position of the laser amplifier while monitoring the positively chirped pulse duration with an autocorrelator. The laser pulse energy was varied from 0.1 to 10 µJ with a half wave plate and linear polarizer. A 0.25 NA aspherical lens focused the laser beam to ~1.2 µm diameter (FWHM) and ~12-µm depth of focus at a position ~200 µm below the surface of fused silica samples (CORNING™ 7940, size of 50×50×1 mm³). The sample was mounted on a 3D motion stage (3) in FIG. 2 (AEROTECH™ ABL1000) and scanned perpendicular to the laser beam direction with velocities of 0.5 to 10 mm/s, yielding modification arrays as illustrated in FIG. 3(b). During the scan, the laser polarization was held parallel to the sample travel direction. Waveguides were formed along the full 50 mm sample length.

After Bragg grating waveguide writing, the fused silica samples were polished at both end facets. Unpolarized 633 nm light from a HeNe laser was coupled into a single mode fiber (THORLABS™ SM600) and then butt-coupled into the waveguides. Near-field profiles of the guided modes were obtained by imaging the output facets with a 100× microscope objective and a CCD camera (SPIRICON™ SP-1550M). Waveguide propagation losses were assessed by imaging the exponential fall-off of the scattered waveguide light with a CCD camera (PANASONIC™ KR222) positioned transversely to the sample.

Within the wide pulse duration range investigated between 50 fs and 1.5 ps, GWs with continuous and homogenous appearance (aside from periodic structures) were observed only within a narrow pulse energy window of 0.6±0.2 µJ and for variation of scan speed from 0.5 to 10 mm/s. Laser tracks appeared faint, discontinuous, or invisible under an optical microscope for pulse energy<0.4 µJ, or consisted of inhomogeneous damage lines above 0.8 µJ. No waveguiding was observed across 50 mm long GW devices outside this 0.6±0.2 µJ range.

Figure 9:
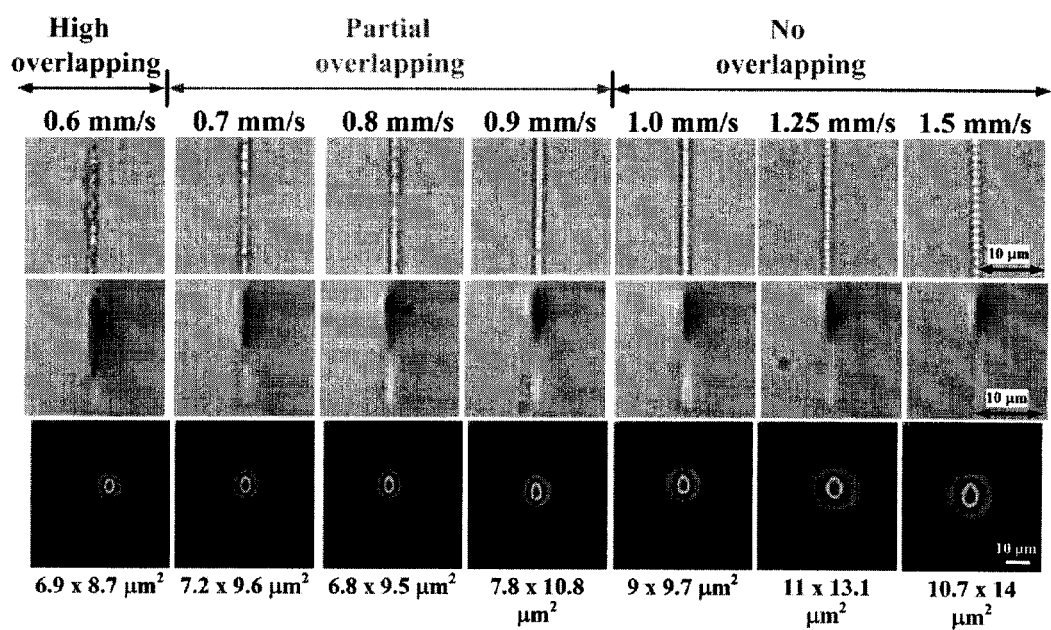
FIG. 9 illustrates microscope images in side view (top row) and the end view (middle row) together with the near-field mode profiles of 633 nm light (bottom row) guided in waveguides that were laser written with 1.0 ps duration and 0.6 µJ pulse energy in fused silica glass. Scan velocities are show above the figures in the top row and the mode sizes (FWHM) are given below in the bottom row. The 1 ps laser is incident from the top in the end view microscope images and the mode field images.

The top row of FIG. 9 shows the transverse optical microscope images of the laser exposed waveguide tracks inscribed in fused silica with 1 ps pulse duration, 0.6 µJ pulse energy, and various scan velocities from v=0.6 to 1.5 mm/s. Three zones of beam spot overlap are identified: high overlapping (>50% overlap) for v<0.6 mm/s, partial overlapping for 0.7<v<0.9 mm/s and non-overlapping for v>1 mm/s. For the scan speeds of 1.25 and 1.5 mm/s, isolated modification zones of 1.2 µm diameter, each formed by a single laser pulse, are identifiable along the translation path. Such structures guide 633 nm light, possibly as a linear array of micro-lenses. However, guiding was not observed for larger spacing of d>2 µm (v>2 mm/s), perhaps due to scattering loss or insufficient focusing from the micro-lenses. For speeds of v<0.8 mm/s, inhomogeneous modification tracks appear that have larger waveguide losses and suggest overexposure. The most uniform and contiguous waveguides are noted only in a narrow range of scan speeds of 0.9 to 1.0 mm/s. This range defines the optimum pulse-to-pulse step size of d≈1 µm in which the lowest-loss waveguides were found in fused silica for the present 1 kHz laser.

It should be expressly understood the parameters disclosed herein are merely examples and do not serve to limit the scope of the present invention. In particular, laser processing windows are subject to change with changes to the substrate material, focus, laser wavelengths, etc.

The center row of microscope images in FIG. 9 shows the backlit cross sections of the waveguides, where the laser radiation was incident from the top. The bright elliptical shapes indicate the region of positive refractive index change responsible for 633 nm waveguiding. Its shape closely matches the 1.2 µm focus diameter and the 12 µm depth-of-focus for the 0.25 NA lens. The mode profile asymmetry can be made more symmetric with higher NA lenses, cylindrical lenses, rectangular masks or multi-pass laser scanning, in a manner that is well known to practitioners in the field. The dark elliptical region above the bright one arises from light refracted out of a lower refractive index volume (i.e. negative index change) or scattered by waveguide inhomogeneities. As total exposure increases (right to left in FIG. 9), the dark volume extends into and overtakes the bright modification volume, suggesting higher waveguide loss will result at lower scan speed.

The guided mode profiles for 633 nm light, shown in the bottom row of FIG. 9, can be represented by a Gaussian profile vertically and evanescent profile laterally that match expectations for an asymmetric 1.2 µm×12 µm guiding cross-section. The mode diameter (average of x and y) increases from 8 to 12 µm (FWHM) as the scan speed increases, indicating an expected decrease in refractive index change with increasing scanning speed. The mode eccentricity varies from 0.4 to 0.7. All waveguides in FIG. 8 were single mode at 633 nm. Mode profiles could not be observed for scanning speeds of v<0.4 mm/s or v>2 mm/s. By separately matching the observed 9 µm by 9.7 µm (FWHM) mode profiles to one-dimensional step-index waveguide models of 1.2 µm and 12 µm size as inferred above from the microscope images, the laser-induced refractive index change of approximately $5\times10^{-4}$ and $4\times10^{-4}$, respectively, is inferred for the 1 ps case of 1 mm/s scan speed.

Figure 10:
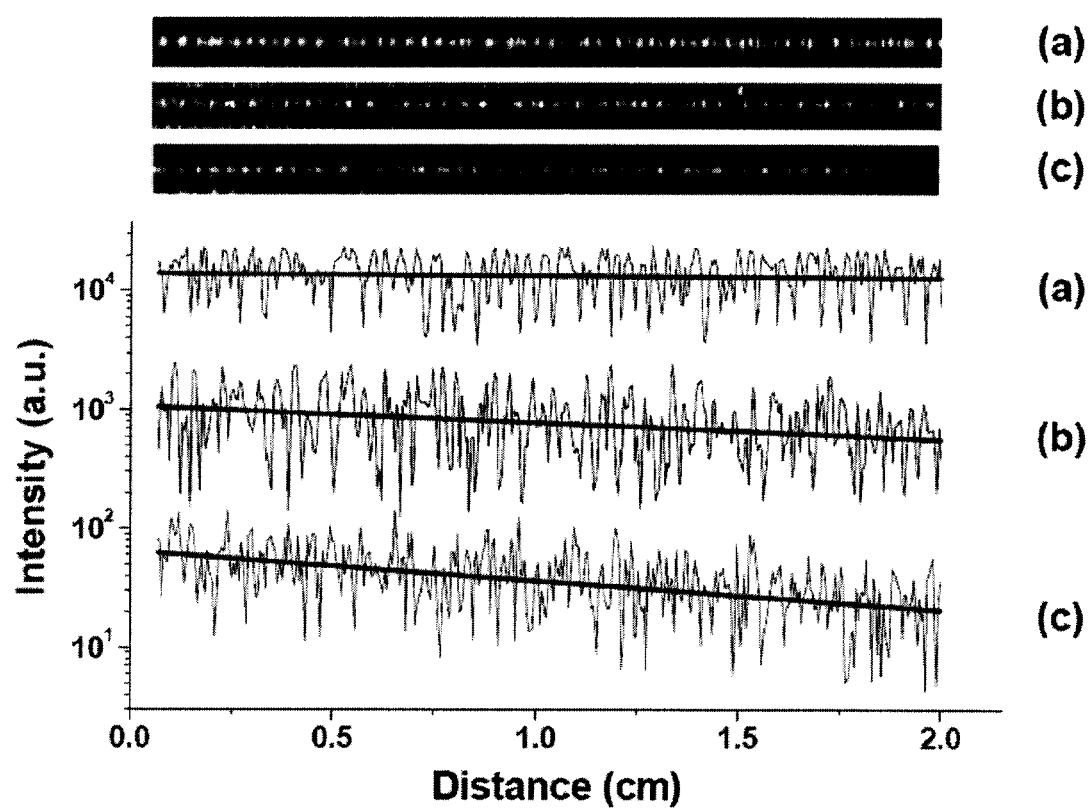
FIG. 10 illustrates three overhead CCD-camera images of scattered waveguide light (top) and three logarithmic plots of scattered intensity versus distance along waveguide for waveguides written with 1 mm/s speed and pulse durations of (a) 1 ps, (b) 1.5 ps and (c) 100 fs. The solid lines mark the fitted exponential decay with respective slopes of (a) 0.2 dB/cm, (b) 1.2 dB/cm and (c) 2.3 dB/cm.
Figure 11:
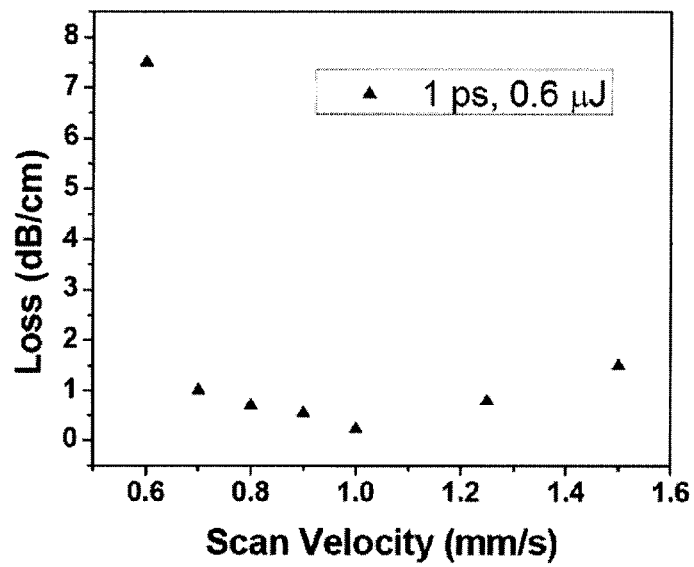
FIG. 11 illustrates waveguide propagation loss as a function of scan velocity for 1 ps duration and 0.6 µJ pulse energy for 633 nm light propagation in grating waveguides formed in fused silica.

FIG. 10 shows the scattered light CCD images recorded from three waveguides fabricated in fused silica with 1 mm/s scan speed and pulse durations of 100 fs, 1 ps and 1.5 ps. The semi-log intensity plots show an exponential fall off along a 2 cm long waveguide section from which propagation losses may be inferred from the solid curve data fits. Data set (a) yields a surprisingly low ~0.2 dB/cm loss. Propagation losses for the waveguide writing conditions used to produce the samples in FIG. 9 are plotted in FIG. 11 as a function of the scan speed. Modest waveguide losses of <1 dB/cm are noted only in a narrow processing window of 0.8 to 1.25 mm/s scanning speed, with a minimum loss of ~0.2 dB/cm at 1 mm/s. Much larger losses (>1 dB/cm) or the complete absence of waveguiding were noted outside this speed range. The lowest loss condition (for ~1 mm/s) corresponds to the most homogeneous modification tracks in the top view microscope image of FIG. 9, that on close inspection appear as contiguous 1 µm demarcations formed by single-pulse interactions.

Figure 12:
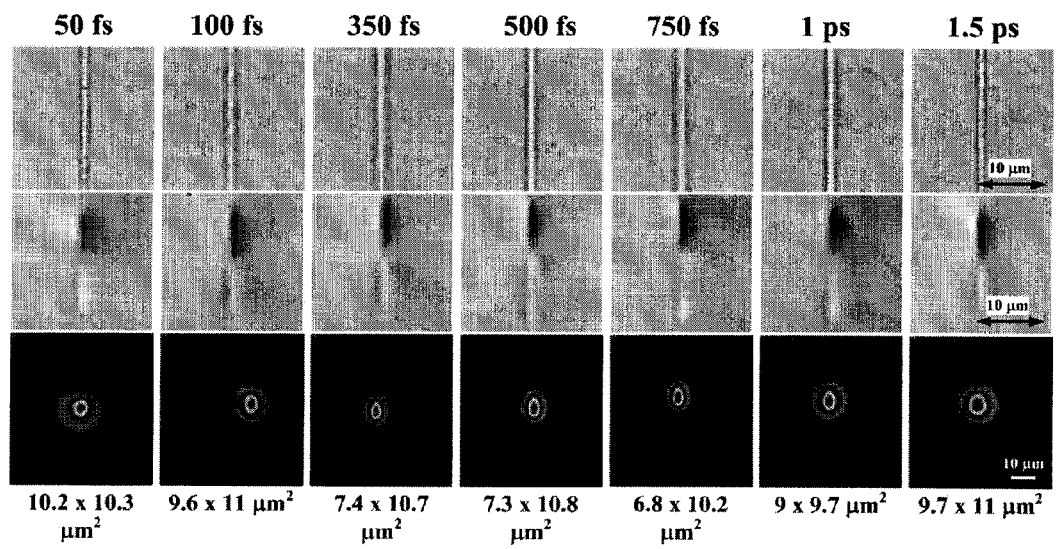
FIG. 12 illustrates microscope images in transverse (top row) and end view (middle row) together with the near-field mode profiles of 633 nm light (bottom row) of grating waveguides written with 1 mm/s scan speed in fused silica. Pulse energies are 0.5 µJ for 50 fs, 0.6 µJ for 100 fs to 1 ps, and 0.7 µJ for 1.5 ps. The mode sizes (FWHM) are given below the bottom row. The laser pulses are incident from the top in the end view and mode field images.

The effect of pulse duration on the waveguide properties was also examined across a wide parameter space of exposure conditions. FIG. 12 shows the transverse (top row) and cross sectional (center row) microscope images together with the near-field mode profiles (bottom row) for 633 nm light guided in the GW devices formed at an optimal 1 mm/s scan speed and at various pulse durations. Pulse energy was optimized for lowest waveguide loss at each pulse duration, yielding 0.5 µJ for 50 fs, 0.6 µJ for 100 fs to 1 ps, and 0.7 µJ for 1.5 ps. Pulses longer than 2 ps generated inhomogeneous waveguides that did not guide 633 nm light.

Surprisingly, there was little variation in the waveguide appearance in either transverse or cross-sectional microscope views, or in the mode diameters, even though a large 30 fold variation of peak intensity has been applied by the 50 fs to 1.5 ps change in laser pulse duration. The average mode diameter decreases slightly from 10.3 µm at 50 fs to a minimum of 9.5 µm at 1 ps, and then increases to 10.4 µm at 1.5 ps. The waveguides are all single mode and asymmetric with eccentricities of 0.1 to 0.7. The waveguides written with 50 fs and 1.5 ps pulses are less homogeneous, but have slightly shorter cross-sectional length than the intermediate pulse duration (0.1 to 1 ps) that possibly accounts for their more symmetric mode profiles. Overall, similar mode structures and nearly identical values of optimized pulse energy suggest the non-linear absorption in fused silica and induced change in refractive index are only weakly dependent on the pulse duration in this 50 fs to 1.5 ps range in this waveguide writing scheme.

Figure 13:
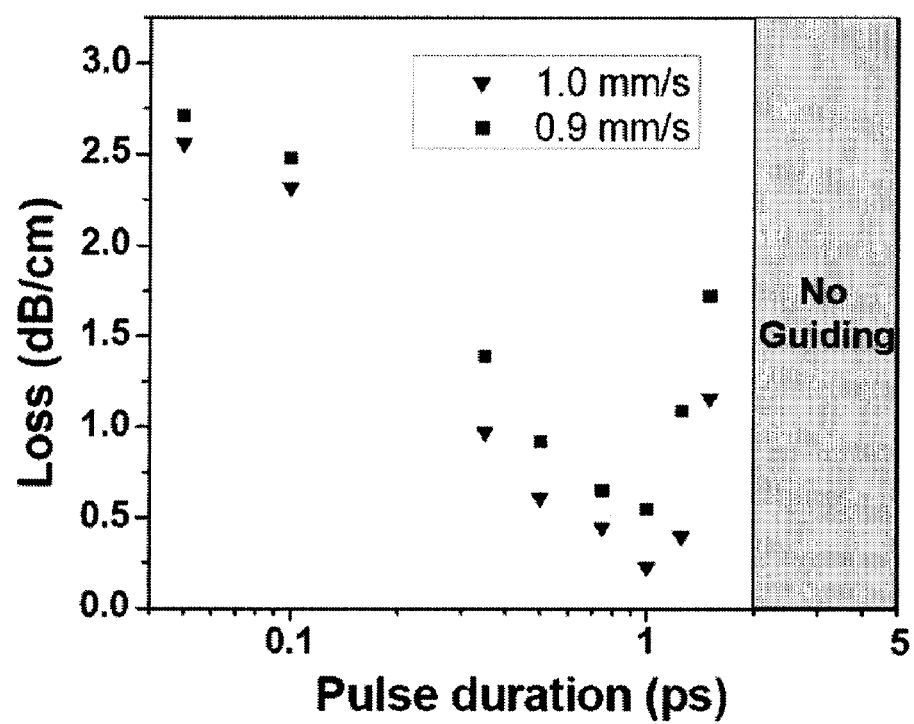
FIG. 13 illustrates the 633 nm propagation losses measured in grating waveguides as a function of the laser pulse duration for 1.0 and 0.9 mm/s scan speeds in fused silica.

Although the waveguide images in FIG. 12 are similar, there is a strong dependence of propagation loss on pulse duration as shown in FIGS. 10 and 13 for the this example of fused silica. Waveguides were written with pulse energy (0.5 to 0.7 μJ in FIG. 12) and scan speeds (0.9 and 1.0 mm/s) optimized for the lowest loss for each pulse duration. The minimum propagation loss of ~0.2 dB/cm was observed for a relatively long 1.0 ps duration. Losses at higher scan speed are also noted as the high refractive-index voxels physically separate at scan speeds>2 mm/s and classical waveguiding by total internal reflection appears to break down.

By selecting appropriately high scan speed, Bragg grating waveguides were fabricated in fused silica glass with low propagation loss. This investigation of waveguide properties reveals a new processing window where non-overlapping interaction volumes are key to forming low-loss Bragg grating waveguides. Such GW structures should behave as filters or reflectors for visible wavelength but were not characterized for their spectral response due to the lack of appropriate spectroscopic equipment at this time.

EXAMPLE 3

Laser exposure conditions were optimized and tighter focusing and longer duration laser pulses led to improved grating strength and reduced waveguide propagation loss. The same 1 kHz Ti:Sapphire ultrafast laser system (Spectra Physics™ Spitfire Pro) delivered 2.4 mJ maximum energy at 800 nm wavelength. The laser pulse duration was tuned from 100 fs to 2 ps by adjusting the laser compressor grating. A tighter 0.55 NA aspheric lens was used to focus the laser beam to ~1 μm diameter ($1/e^2$ intensity) at a position 200 μm below the surface of a borosilicate glass sample (Corning EAGLE2000™, 50 mm×10 mm×1 mm). The glass sample was mounted on 3D air-bearing motion stages (Aerotech™ ABL1000, 2 nm resolution and 50 nm repeatability) and scanned transverse to the laser direction to produce 10 mm long grating waveguides. Sample scan speed was fixed at 0.52 mm/s to yield $1^{st}$-order Bragg reflection at 1550 nm for the 1 kHz laser repetition rate. The laser energy was adjusted from 0.5 to 10 μJ with a half-wave plate and polarizer. Laser polarization was perpendicular to the sample scan direction.

The sample was ground and polished on both facets after laser exposure. The GWs were then characterized in terms of guided modes, propagation losses, transmission spectra, and reflection spectra as in the previous examples. Further, the grating waveguide birefringence was characterized with the arrangement shown in FIG. 14. Unpolarized light from a broadband source (THORLABS™ ASE FL7002) was collimated in free space, then focused into the laser-formed waveguides by a 30× objective lens. A linear polarizer then excited transverse magnetic (TM; electric field 90° to sample surface), transverse electric (TE; electric field parallel to surface), and mixed TE/TM modes (45° linear polarization) in the BGWs, while the half-wave plate was used to adjust the light intensity. Index matching fluid was applied at glass-fiber interfaces for all spectral recordings and insertion loss measurements.

The BGWs were formed as an array of index voxels with 0.52 μm centre-to-centre separation when using 0.52 mm/s scan speed and 1 kHz laser repetition rate. Over the wide 100 fs to 2 ps pulse duration range examined, continuous and homogenous modification tracks (aside from periodic structures) were observed with an optical microscope only for pulse durations in the range of 100 fs to 1.5 ps and pulse energy in the range of 2 to 7 μJ. The laser tracks appeared faint, discontinuous, or invisible for lower pulse energy of <2 μJ, or appeared inhomogeneous and damaged above 7 μJ. For all pulse durations tested, the lowest propagation losses were found at pulse energies only near 3 μJ, slightly above the ~2 μJ threshold for generating guiding tracks.

Figure 15:
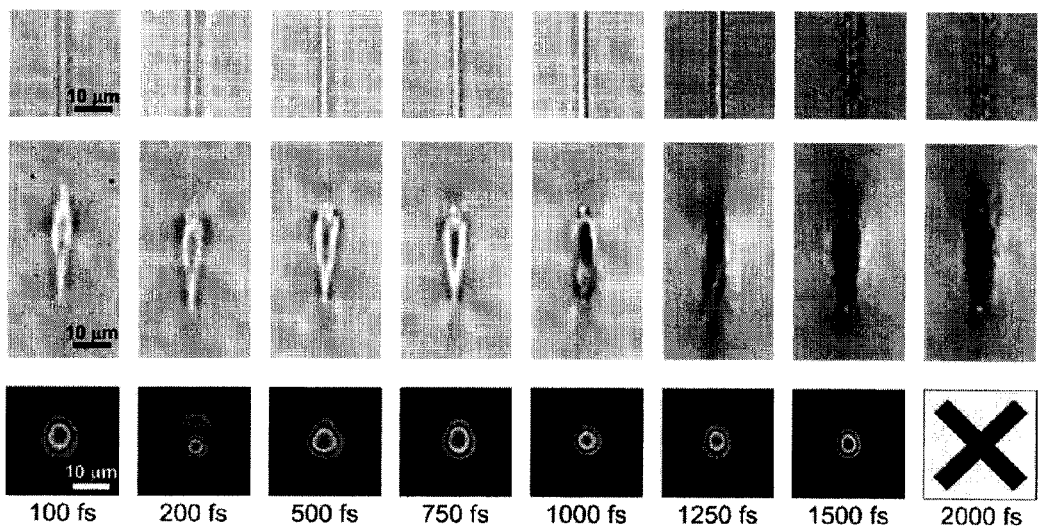
FIG. 15 illustrates microscope images in overhead (top row) and cross-sectional end-view (middle row) together with the guided mode profiles at 1560-nm wavelength (bottom row) of grating waveguides inscribed with 3 µJ pulse energy, 0.52 mm/s scan speed, and pulse durations from 100 fs to 2 ps.

The top row of FIG. 15 shows overhead optical microscope images of the GWs inscribed with 3 μJ pulse energy, 0.52 mm/s scan speed, and pulse durations from 100 fs to 2 ps. The waveguides all appear ~2 μm wide, and the 0.52 μm voxel separation was not resolvable with the optical microscope. Inhomogeneous damage tracks were observed for pulses longer than 1.25 ps. A similar trend is apparent in the cross-sectional end-view of the waveguides shown in the middle row of FIG. 15. The bright near-circular shapes at the top mark the region of positive refractive index change responsible for infrared waveguiding. However, the laser-modified region extends vertically for ~30 μm further below this spot, far exceeding the 3 μm theoretical value for the depth of focus. For the GWs written with pulses longer than 1 ps, the cross-section was defined by a dark elliptical shape that is indicative of negative refractive index change or formation of inhomogeneous scattering centers.

Guided mode profiles at 1560 nm wavelength are shown in the bottom row of FIG. 15. With the exception of 200 fs, all the modes could be well-approximated by Gaussian intensity profiles along both horizontal and vertical axes with slightly elongated vertical dimension (aspect ratio ~1.1). For 1 ps pulse duration, the 10 μm×11 μm mode-field diameter suggests a small <0.1 dB coupling loss with standard single mode fiber according to modal overlap calculation. MODE Solutions™ software (Lumerical™) was used to match this profile to a step-index cylindrical waveguide with 2 μm diameter, and provide an estimate of $\Delta n_{DC}$=~0.01 for average refractive index change. All waveguides in FIG. 15 were single mode at wavelengths from 1500 nm to 1600 nm.

Figure 16A:
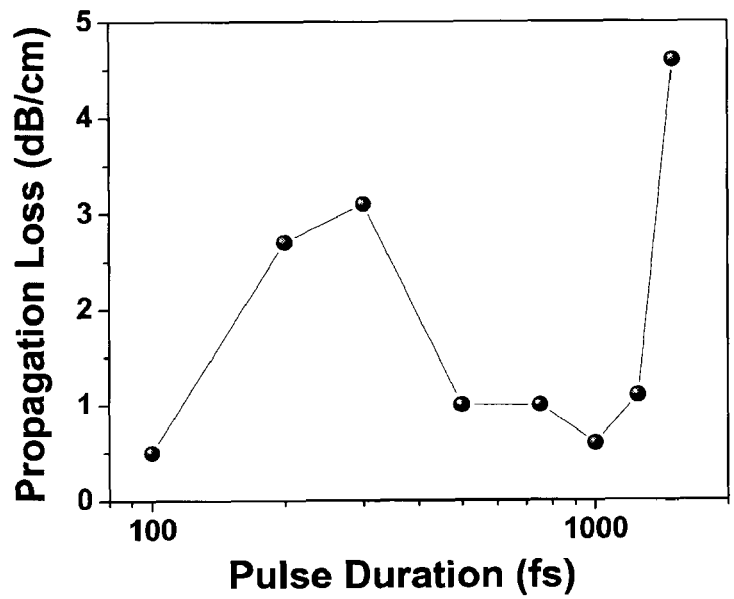
FIG. 16 illustrates (a) a plot of the measured propagation loss as a function of pulse duration for 1560-nm wavelength guiding, and (b) a plot of the propagation losses of waveguides written with various pulse energies, at pulse durations of 100 fs, 300 fs, and 1 ps.
Figure 16B:
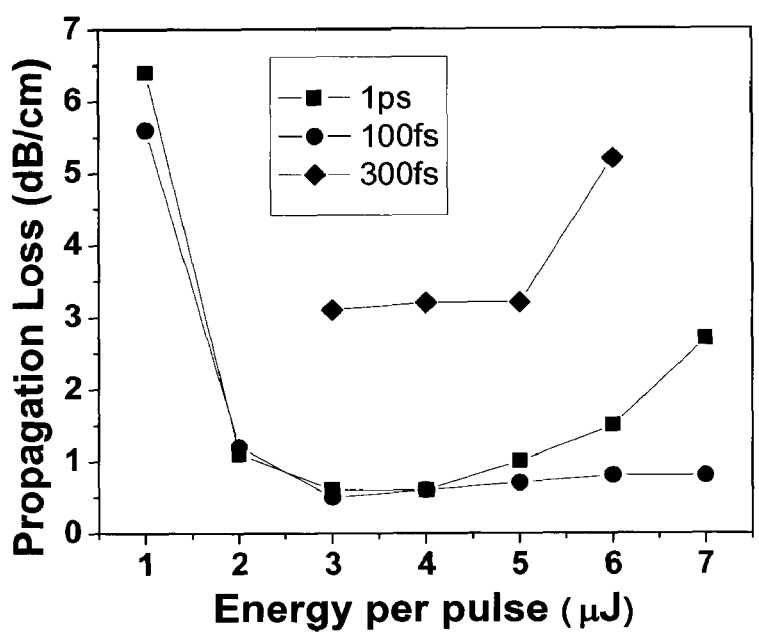

FIG. 16(a) plots the measured propagation loss as a function of pulse duration for 1560 nm wavelength guiding in the BGWs shown in FIG. 15. Two windows for low-loss waveguide writing of ~0.5 dB/cm are apparent at 100 fs and 1 ps pulse duration. The losses are much higher (>3 dB/cm) in between these two windows. Losses increased more sharply above 1.0 ps and guiding was no longer observable above 2 ps. FIG. 16(b) shows the propagation losses of waveguides written with various pulse energies, at pulse durations of 100 fs, 300 fs, and 1 ps. Energies lower than 3 μJ rendered insufficient refractive index changes and led to high insertion losses. The lowest waveguide losses appeared around 3 μJ for all the 3 pulse durations.

Figure 17A:
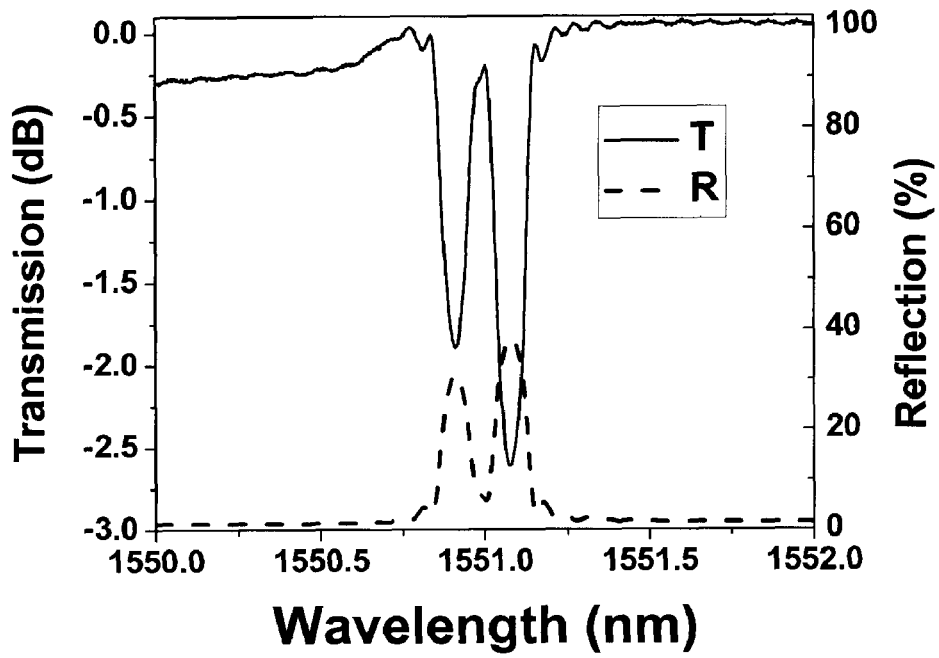
FIG. 17 illustrates Bragg transmission responses for samples formed by (a) 100-fs duration and 3-µJ energy pulses, and (b) 1.0-ps pulse duration and 3-µJ pulse energy.
Figure 17B:
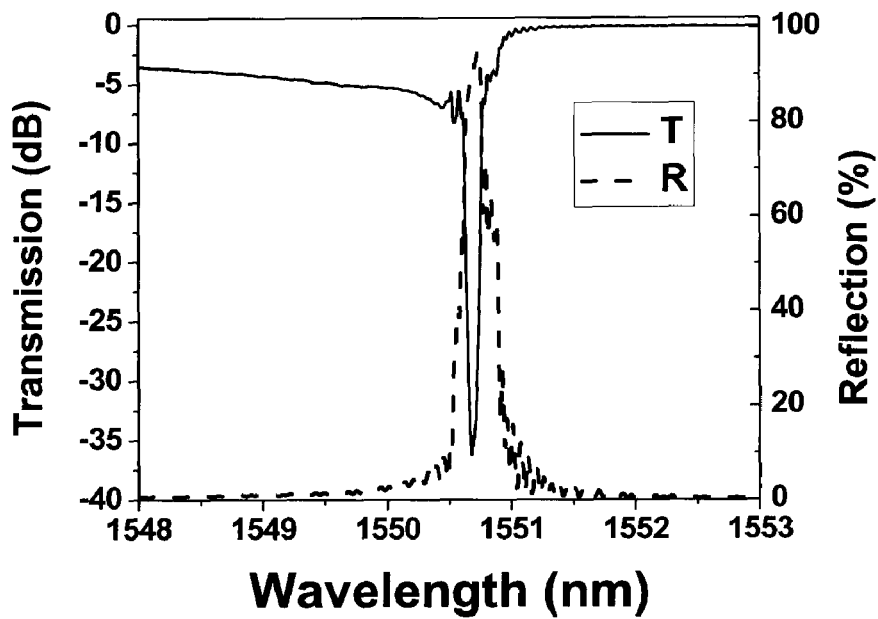

Bragg grating responses were systematically characterized with for BGWs formed with 1 to 7 μJ laser pulse energy and 100 to 1500 fs pulse duration. Optimized Bragg transmission responses varied from relatively weak (<5 dB) dual-peaked lines at short 100 fs pulse duration to strong >35 dB single-peaked resonances at long 1.0 ps pulse duration as shown in FIG. 17. In FIG. 17(a) two sharply resolved (0.1 nm wide FWHM) peaks at 1550.9 nm and 1551.1 nm wavelength indicate waveguide birefringence, and present only weak 1.9 dB and 2.6 dB transmission and 31% and 38% reflection resonances, respectively, for 100 fs duration and 3 μJ energy pulses. In contrast, FIG. 17(b) shows that much stronger responses of 35 dB in transmission and 95% in reflection is available in similar 0.2 nm bandwidth from a BGW written with 1.0 ps pulse duration and 3 μJ pulse energy. Radiation mode losses of ~0.3 dB and 5 dB are apparent on the short wavelength side of the Bragg resonance in the 100 fs and 1 ps cases, respectively. The ac refractive index modulation $\Delta n_{AC}$ for the 10 mm long BGW in FIG. 4(b) is estimates to be $\Delta n_{AC}$ of ~4×10$^{-3}$, representing a large ~40% component of the average refractive index $\Delta n_{DC}$=~0.01 inferred above. Such index modulation is an order of magnitude larger than typically found in strong fiber Bragg gratings (FBG), and is consistent with formation of optically isolated index voxels during the type II waveguide writing process.

Figure 18:
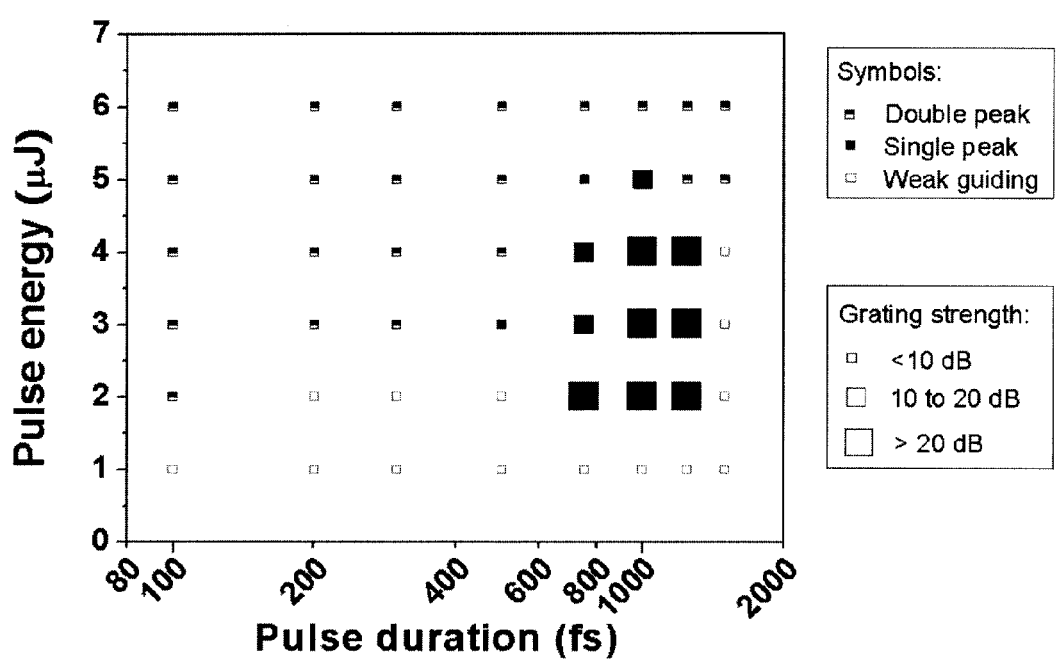
FIG. 18 illustrates grating waveguides classified by grating strength, propagation loss, and birefringence and mapped according to laser pulse energy and duration.

The BGWs were classified by grating strength, propagation loss, and birefringence and mapped according to laser pulse energy and duration in FIG. 18. The symbol size represents the grating strength in transmission, with small, medium, and large corresponding to <10 dB, 10 to 20 dB, and >20 dB response, respectively. Half-filled squares represent birefringent BGWs and solid squares correspond to non-birefringent BGWs with single peaks. Open squares represent BGWs with large propagation loss (>3 dB/cm). For pulse duration less than 500 fs, FIG. 5 shows effective guiding above a 1 to 2 µJ energy threshold, but only producing birefringent and weak gratings (<10 dB). An optimum window for generating strong (>20 dB) and low-loss (~0.5 dB/cm) BGWs is identified for 0.8 to 1.2 ps duration and 3 to 6 µJ pulse energy. Higher pulse energy yielded weaker and double-peaked gratings while longer pulse duration (1.5 ps) required higher pulse energy (5 µJ) for guiding and provided only weak and birefringent BGWs.

Figure 14:
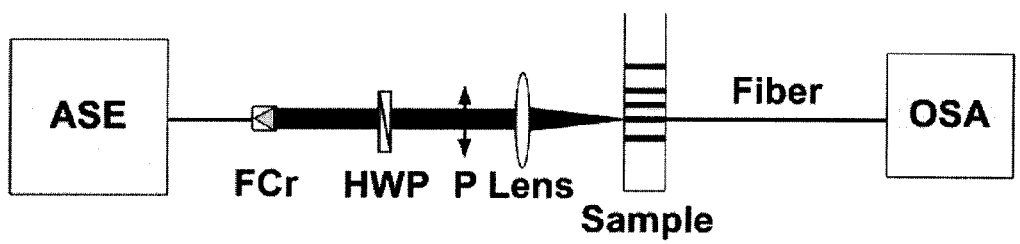
FIG. 14 illustrates apparatus for assessing the grating waveguide birefringence.
Figure 19A:
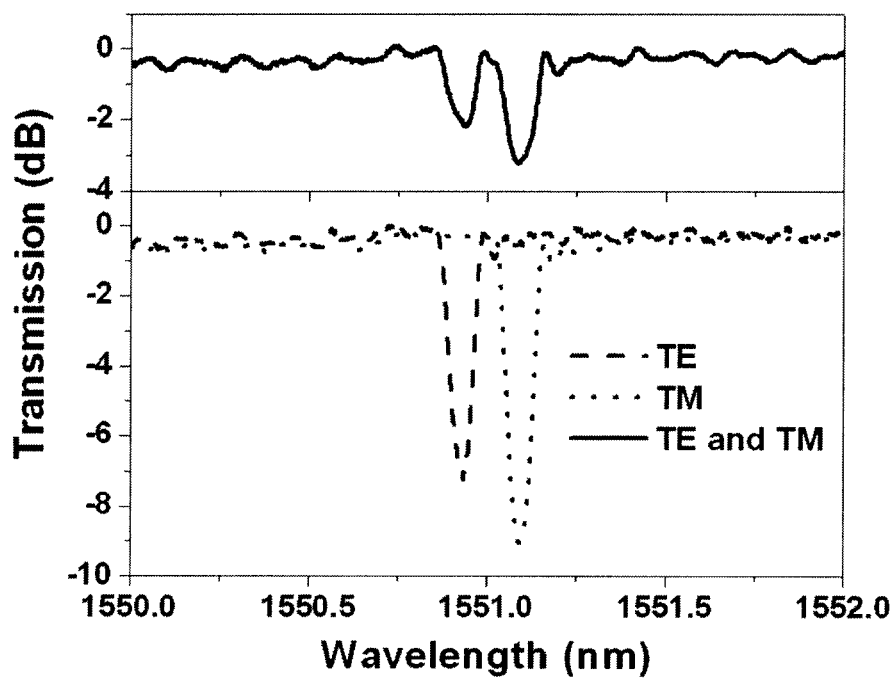
FIG. 19 illustrates (a) transmission response for the TE and TM transmission spectra (bottom) recorded for the grating waveguides in FIG. 17(a), together with a spectrum excited by 45° linearly polarized light (top), and (b) the waveguide birefringence as a function of pulse duration.
Figure 19B:
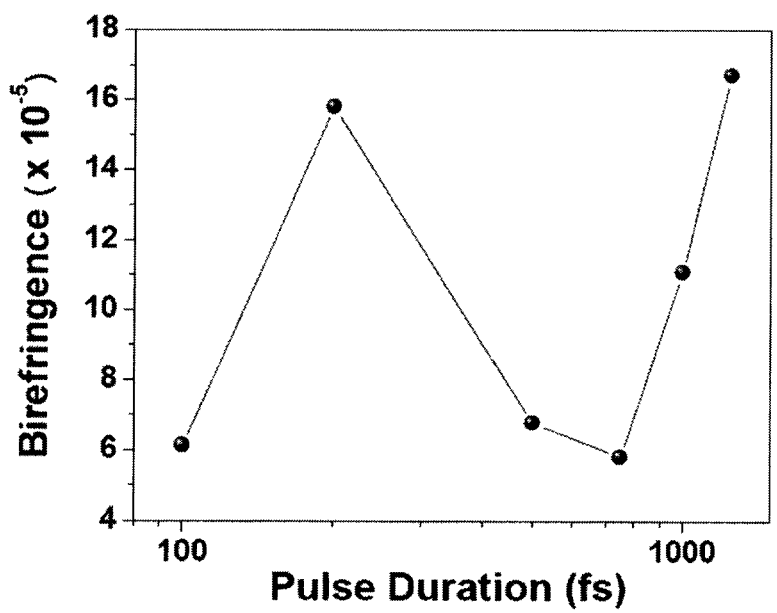

To assess the waveguide birefringence, the BGWs were excited with distinct polarization modes using the free space end-firing arrangement of FIG. 14. FIG. 19(a) shows the TE and TM transmission spectra (bottom) recorded for the BGW in FIG. 17(a), together with a spectrum excited by 45° linearly polarized light (top). The double-peaked spectrum for 45° polarization closely matches that of FIG. 17(a), which was excited with unpolarized light. The spectra separated into two distinct Bragg resonances for pure TE and TM mode excitation, yielding stronger resonances of 6.5 dB and 9.2 dB at $\lambda_{TE}$=1550.9 and $\lambda_{TM}$=1551.1 nm, respectively, compared with the respective ~2 dB and 3.2 dB peaks for the unpolarized light in FIG. 17(a). The waveguide birefringence in BGWs written with 6 µJ pulse energy was inferred from $\Delta n_B = n_{TM} - n_{TE} = (\lambda_{TM} - \lambda_{TE})/2\Lambda$, where $\Lambda$=0.52 µm is the grating period, and plotted in FIG. 19(b) as a function of pulse duration. The birefringence strongly correlates with the propagation loss data in FIG. 16(a), suggesting that laser damage also induces asymmetric waveguide stresses. At ~0.1-nm spectral separation, the TE and TM resonances merged into unresolved lines, setting an upper bound of $\Delta n_B$=~1×10$^{-4}$, for the measurable birefringence in waveguides formed at lower pulse energy, particularly those in the optimum processing window of 1.0 ps duration and 3 µJ pulse energy.

EXAMPLE 4

The thermal stability and temperature response of the GWs was tested for long-lifetime optical applications, for example, in sensing or telecommunications.

The BGWs were fabricated according to the conditions presented in example 3 for borosilicate glass (Corning Eagle2000™). Low-loss BGWs written with 3 µJ pulses of 100 fs and 1.0 ps duration were heated in a tube furnace in several heating cycles beginning at 250° C. for 1, 1, 2, and 4 hours (i.e. total accumulated 1, 2, 4, 8 hours), then for 1 hour at 500° C., and finally for one 1 hour at 750° C. After each bake, the samples were cooled to room temperature, observed under an optical microscope, and characterized for mode profile, Bragg wavelength, birefringence, and transmission strength. Results are summarized in FIG. 20 for the weak and birefringent BGWs formed at 100 fs duration and in FIG. 21 for the strong and birefringence-free BGWs formed at 1 ps.

Figure 20A:
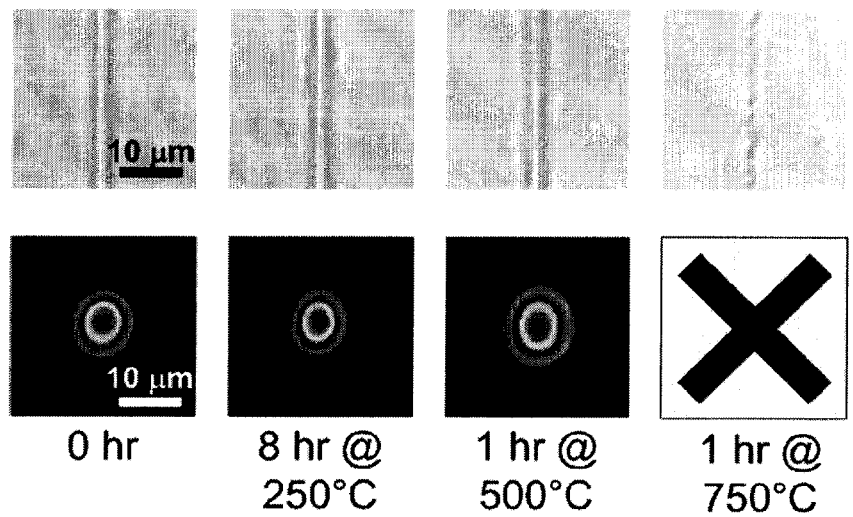
FIG. 20 illustrates (a) microscope images (top) and mode profiles (bottom) and (b) waveguide birefringence, Bragg wavelength, and grating strength for weak and birefringent grating waveguides formed at 100 fs duration, and subjected to several heating cycles.
Figure 20B:
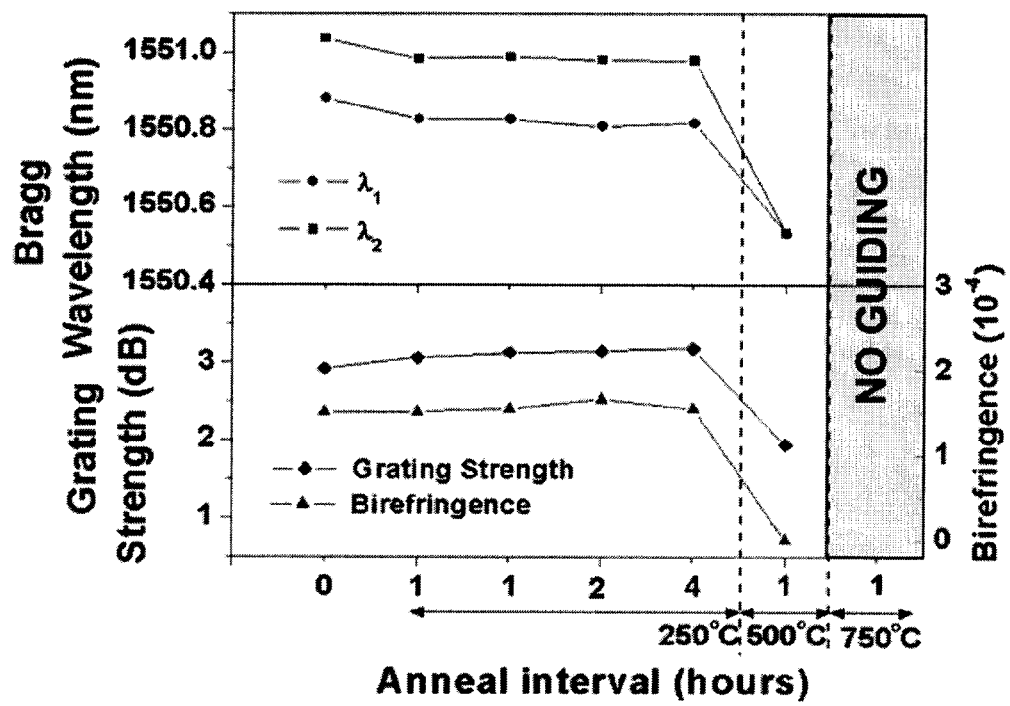
Figure 21A:
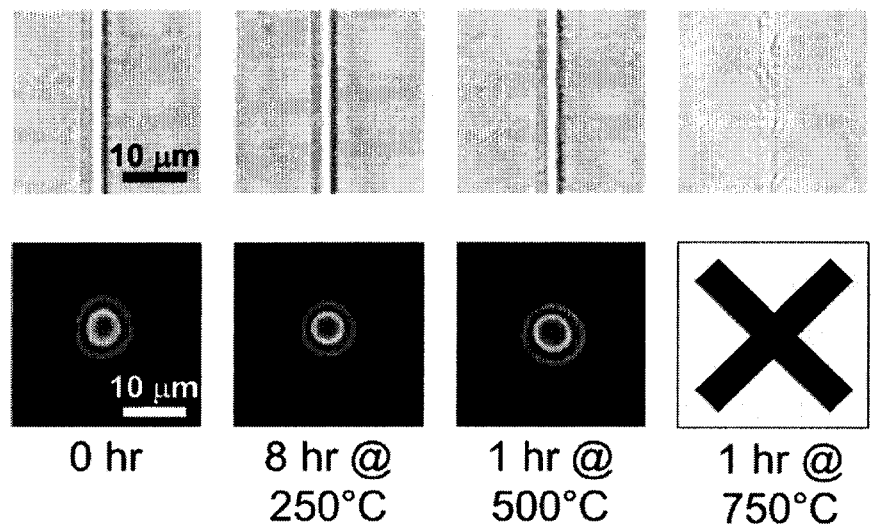
FIG. 21 illustrates (a) microscope images (top) and mode profiles (bottom) and (b) waveguide birefringence and Bragg wavelength for strong and birefringence-free BGWs formed at 1 ps, and subjected to several heating cycles.
Figure 21B:
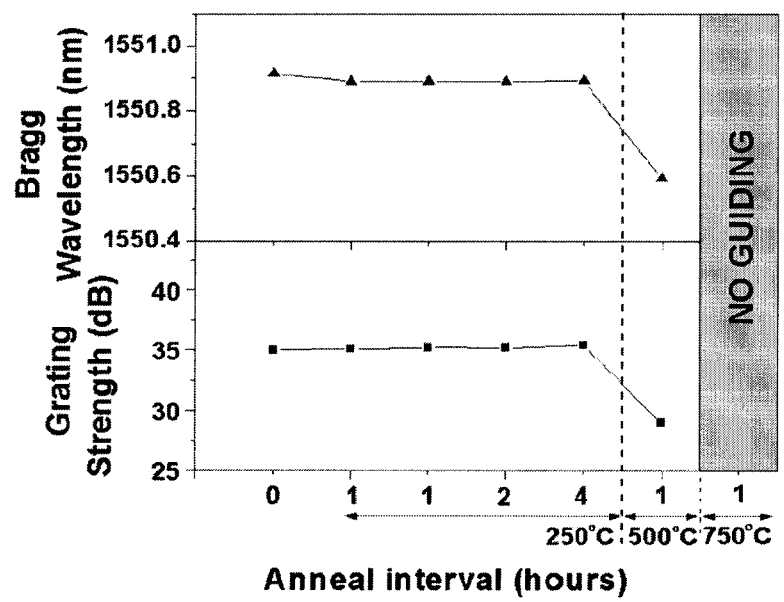

The microscope images in FIG. 20(a) and FIG. 21(a) show no change in both the 100 fs and 1 ps waveguides for the 250 and 500° C. heating steps, but strong fading is apparent after the 750° C. annealing step which exceeds the 666° C. strain point for the glass. Waveguiding was no longer observable after this 750° C. cycle. Inspection of mode profiles in FIG. 20(a) and FIG. 21(a) reveal strong degradation after the 500° C. heat cycle, with mode profile diameter increasing 80% from 11 µm to 20 µm for the 100-fs BGW sample and from 10 µm to 18 µm for the 1-ps case. These changes were commensurate with weakened Bragg resonances as shown respectively in FIG. 20(b) and FIG. 21(b) by respective 0.45 nm and 0.3 nm wavelength shifts and diminished transmission peaks from ~3 dB to ~2 dB and from ~35 dB to ~29 dB, respectively. Waveguide birefringence was also no longer detectable in the weaker 100 fs BGWs after the final heating cycle. These wavelength shifts represent a reduction in the effective index by $\Delta n$=~4×10$^{-4}$ in the 100 fs waveguides and 3×10$^{-4}$ in the 1 ps waveguides, with results overall pointing to moderate structural changes and stress reduction at this high 500° C. temperature.

The 100 fs and 1 ps BGWs remained stable with no degradation of grating strength following each of the four annealing steps at 250° C. A small 0.015 nm shift of Bragg wavelength occurred only for the first 250° C. heat cycle for the 1 ps BGW, representing a small ~1×10$^{-5}$ decrease in refractive index that may be a thermo-optic response due to ±1° C. room temperature fluctuation. For the 100 fs BGWs, both TE and TM resonances shifted ~0.06 nm during the first hour of 250° C. baking, while also remaining stable thereafter for the additional 7 hours of annealing. This larger wavelength shift corresponds to an effective refractive index decrease of ~6×10$^{-5}$ that represents a modest 0.6% of the total $\Delta n_{DC}$ change induced by laser writing.

Figure 22:
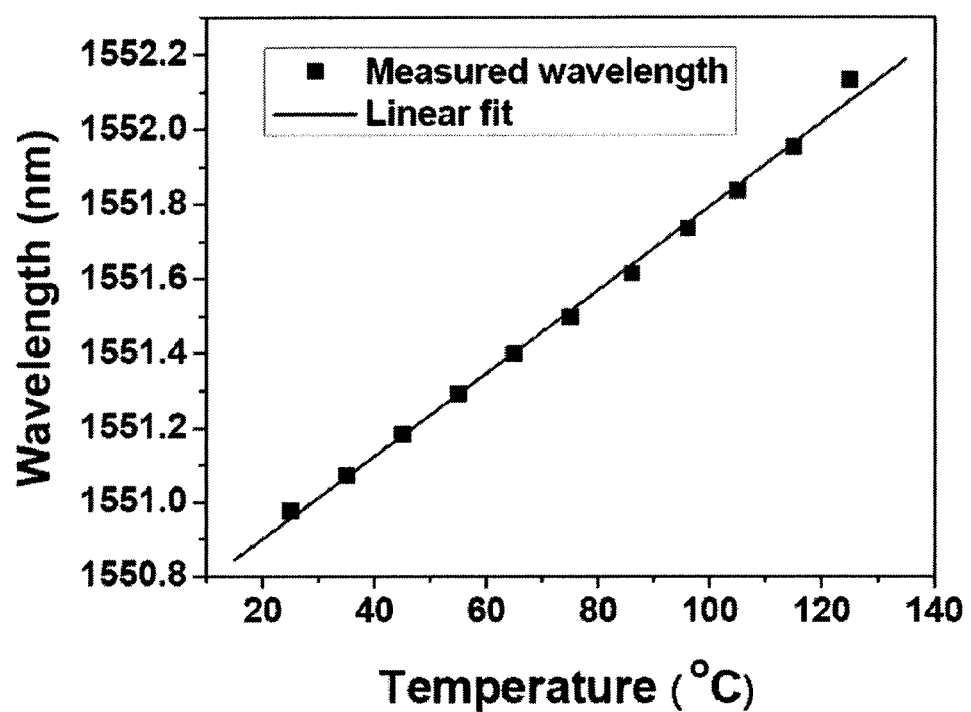
FIG. 22 illustrates a plot of wavelength shift with respect to the temperature for a grating waveguide.

To test the wavelength shift with respect to the temperature, the sample was heated on a hotplate to various temperatures. The measured Bragg wavelength for each temperature is plotted in FIG. 22. A fit to the data showed good linear behavior of the Bragg wavelength with respect to temperature. The slope of the fit, 11.2 pm/° C., revealed the thermo-optic response of the BGWs as a temperature sensor, and is close to the ~13.7 pm/° C. for the standard SMF28 fiber. The difference probably resulted from smaller BGW core that has different thermo-optic coefficient than the standard fiber core.

What is claimed is:

1. A method of fabricating an optical device, the optical device comprising a medium substrate having an integrated grating and waveguide structure, characterised in that the method comprises:
    scanning a pulsed laser means along a path in the medium substrate to form the waveguide structure and the integrated grating in a single-step;
    wherein each pulse of the laser means defines an interaction volume along the path in the medium substrate; and
    wherein the plurality of interaction volumes along, the path define the integrated grating and waveguide structure.

2. The method of claim 1 further characterised in that the interaction volumes are substantially overlapping.

3. The method of claim 2 further characterised in that degree of overlap is pre-calculated based on scanning parameters.

4. The method of claim 1 further characterised in that the optical device is three-dimensional.

5. The method of claim 4 further characterised in that the scanning is controlled to define the plurality of interaction volumes along the path to generate the integrated grating and waveguide structure for use as a directional coupler, an asymmetric coupler, a symmetric splitter, an asymmetric splitter, a ring resonator, a mode converter, a distributed Bragg reflector, a chirped Bragg grating, an apodized Bragg grating, an add-drop filter, a sensor, or a laser reflector.

6. The method of claim 1 further characterised in that the laser means is a pulsed ultrashort laser, a pulsed ultraviolet source, a pulsed extreme ultraviolet source, or a modulated continuous laser.

7. The method of claim 1 further characterised in that the laser means is a pulsed ultrashort laser having a pulse with duration of 3 fs to μs, 1 Hz to 1 MHz repetition rate, and pulse energy up to 2.5 mJ.

8. The method of claim 7 further characterised in that a temporal profile of the laser pulse is Gaussian, super Gaussian, Lorentzian, modified Lorentzian, flat-top, Voigt, or symmetric or aysmetric, and optionally include single or multiple spikes, long tails, or unusual profiles.

9. The method of claim 1 further characterised in that the scanning speed is 0.1 to 100.0 mm/s.

10. The method of claim 1 further characterised in that the interaction volumes have approximate centre points spaced apart by 50 nm to 1 mm between adjacent interaction volumes.

11. The method of claim 1 further characterised in that the medium substrate is glass, polymer, lithium niobate, doped or undoped Sapphire, KGW, BBO, LBO, a semiconductor material, silicon, GaAs, InP, or fused silica.

12. An optical device comprising a medium substrate having an integrated grating and waveguide structure, characterised in that the integrated grating and waveguide structure consists of a plurality of modified volumes defined by a pulsed laser means scanned across a path in the medium substrate that forms the integrated grating and waveguide structure in a single-step.

13. The optical device of claim 12 further characterised in that the optical device is three-dimensional.

14. The optical device of claim 13 further characterised in that the integrated grating and waveguide structure enable the optical device to be used as a directional coupler, and asymmetric coupler, a symmetric splitter, an asymmetric splitter, a ring resonator, an apodized Bragg reflector, a distributed Bragg reflector, a mode converter, a chirped Bragg grating, an add-drop filter, a sensor, or a laser reflector.

15. The optical device of claim 12 further characterised in that the interaction volumes have approximate centre points and are spaced apart by to 50 nm to 1 mm between centre points of adjacent interaction volumes.

16. The optical device of claim 12 further characterised in that the medium substrate is glass, polymer, lithium niobate; doped or undoped Sapphire, KGW, BBO, LBO, a semiconductor material, silicon, GaAs, InP, or fused silica.

* * * * *